United States Patent
Nakamura et al.

[11] Patent Number: 5,937,930
[45] Date of Patent: Aug. 17, 1999

[54] METHOD FOR CASTING CONDUCTOR OF A CAGE ROTOR OF AN INDUCTION MOTOR AND APPARATUS FOR CASTING THE SAME

[75] Inventors: Kosei Nakamura, Oshino-mura; Yukio Katsuzawa, Minamitsuri-gun; Yasuyuki Nakazawa, Oshino-mura, all of Japan

[73] Assignee: Fanuc Ltd., Minamitsuru, Japan

[21] Appl. No.: 09/011,219

[22] PCT Filed: Jun. 12, 1997

[86] PCT No.: PCT/JP97/02037

§ 371 Date: Feb. 9, 1998

§ 102(e) Date: Feb. 9, 1998

[87] PCT Pub. No.: WO97/48171

PCT Pub. Date: Dec. 18, 1997

[30] Foreign Application Priority Data

Jun. 12, 1996 [JP] Japan .................................. 8-171636

[51] Int. Cl.⁶ .......................... B22D 23/04; B22D 17/24; B22D 19/00
[52] U.S. Cl. .......................... 164/112; 164/332; 164/333; 164/334; 29/598; 310/11
[58] Field of Search .................................. 164/333, 112, 164/113, 332, 334, 312; 29/598; 310/211

[56] References Cited

U.S. PATENT DOCUMENTS

| | | | |
|---|---|---|---|
| 4,845,837 | 7/1989 | Lloyd | 29/598 |
| 4,939,398 | 7/1990 | Lloyd | 29/598 |
| 5,444,319 | 8/1995 | Nakamura et al. | 310/211 |
| 5,467,521 | 11/1995 | Nakamura et al. | 29/598 |
| 5,538,067 | 7/1996 | Nakamura et al. | 164/112 |
| 5,572,080 | 11/1996 | Nakamura et al. | 310/211 |

FOREIGN PATENT DOCUMENTS 52-146804 12/1977 Japan .
6-225505 8/1994 Japan .

*Primary Examiner*—Patrick Ryan
*Assistant Examiner*—Anjan Dey
*Attorney, Agent, or Firm*—Staas & Halsey

[57] ABSTRACT

The invention relates to an apparatus for casting a conductor of a cage rotor of an induction motor. A rotor core (13) comprising a laminated steel sheets is housed in a recess portion of a casting mold, an upper end portion thereof is held by a holding portion (70) and molten metal is supplied into a plurality of slots formed in the rotor core, thereby forming a plurality of conductor rods and a pair of end rings connecting the ends of the conductor rods with one another. The holding portion (70) comprises a cup (72) and a cylinder (73), and an axial dimension of the cup (72) is selected in correspondence to an axial dimension of the rotor core (13) housed in the recess portion of the casting mold. Further, by using a double cylinder (77, 79) in the holding portion (70), a rotor having higher quality can be obtained. For this reason, the same conductor casting apparatus can be used for casting the conductor of the rotor having different axial lengths and qualities depending on specifications.

11 Claims, 15 Drawing Sheets

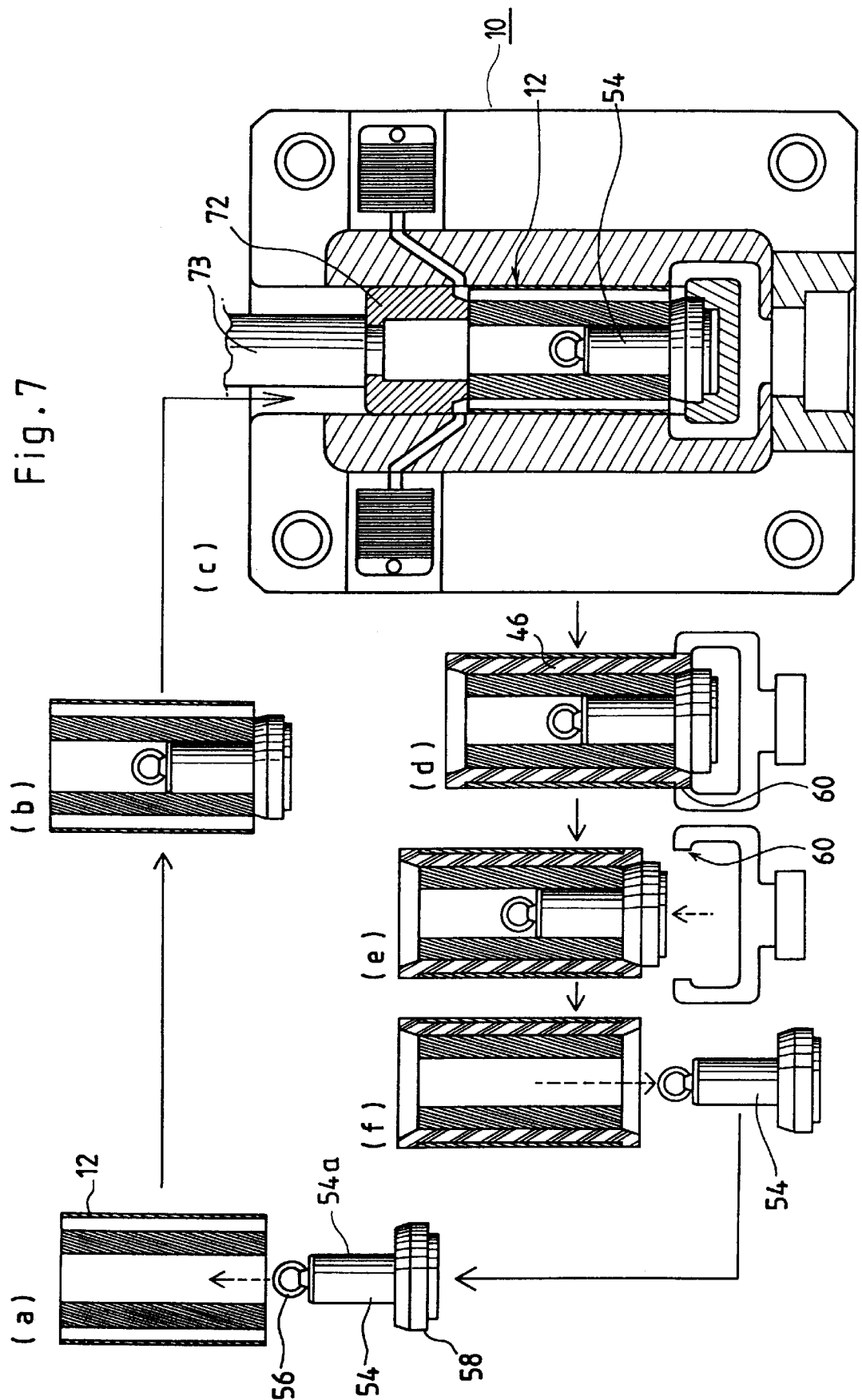

METHOD FOR CASTING CONDUCTOR OF A CAGE ROTOR OF AN INDUCTION MOTOR AND APPARATUS FOR CASTING THE SAME

FIELD OF THE TECHNOLOGY

The present invention relates to a method for casting a conductor of a cage rotor of an induction motor and an apparatus for casting the same.

BACKGROUND ART

When manufacturing a cage rotor which is used in an induction motor, there has been known a method for integrally forming conductor rods to be disposed in a plurality of slots of a rotor core and end rings connecting each of the conductor rods at both ends in an axial direction by casting such as a die casting and the like. The conductor forming method mentioned above has an excellent productivity and can easily form a conductor having a desired shape, and further the method is suited for improving the characteristic of the motor. For this reason, the method has been widely employed in particular for a compact induction motor. A method for manufacturing a conventional cage rotor of an induction motor will be described with reference to a flow chart shown in FIG. 14 and schematic diagrams shown in FIG. 15(a), FIG. 15(b), FIG. 15(c) and FIG. 15(d).

A cage rotor 12 is provided with a plurality of laminated steel sheets 11 (FIG. 15(a)) which has a plurality of circumferential slots 44, and conductor rods 46 (FIG. 15(d)) extending through the slots 44 of the piled up laminated steel sheets 11.

Then, a method for manufacturing the cage rotor 12 will be described below with reference to the flow chart shown in FIG. 14.

First, a plurality of laminating steel sheet 11 are piled up and stacked so as to form the rotor core 12 by passing a hole formed in a center of the laminated steel sheet 11 through a fixed mandrel 90 (FIG. 15(b)) (Step S11). Next, the thickness of the laminated material is adjusted by measuring the laminated thickness of the stacked rotor core 12 (Step S12). Then, as shown in FIG. 15(b), balance rings 92 are placed on an upper end and a lower end of the rotor core 12 and then those balance rings 92 and the rotor core 12 are tightened each other by fastening portions 94 and 96 (Step S13 and FIG. 15(b))

Next, after pre-heating the rotor core 12 (Step S14), the rotor core 12 is inserted into a metal mold. Then, molten metal such as aluminum and the like is filled in the metal mold at a high speed and a high pressure. That is, a die casting is performed (Step S15). After the molten metal is solidified within the slot 44 of the rotor core 12, the mandrel 90 is pulled out from the rotor core 12 (Step S16).

FIG. 15(d) shows a state that the mandrel 90 is pulled out from the rotor core 12. In general, since the diameter of the mandrel 90 is selected to be smaller by a value d (a degree of play) than the diameter of the hole formed in the center of the laminated steel sheet 11, as shown in FIG. 15(c), the center holes of the plurality of laminated steel sheet 11 stacked to each other are not aligned with each other, as shown in FIG. 15(b) and FIG. 15(d), thereby forming an unevenness on the internal side surface. This unevenness is leveled by later machining, thereby making easier the insertion of the rotor shaft. Further, sometimes, the outer surface of the rotor core 12 may be leveled by removing the unevenness thereon.

However, in the method for casting the conductor of the rotor core mentioned above, there are problems arising from number of kinds of, number of or performance of jigs necessary for casting the metal mold, the mandrel and the like, which affect forming efficiency and quality of the rotor core.

That is, when manufacturing induction motors for various output specifications, there arises a problem such that various kinds of metal molds are necessary. In general, the output of the induction motor is differentiated by changing an axial length while keeping the diameter of the cage rotor constant. Therefore, the rotor cores having the same diameters but having different axial lengths are necessary for many kinds of output specifications. However, for different axial lengths of the rotor core, different metal molds (even if the diameters are the same) are necessary. Accordingly, the different metal molds are necessary for the induction motors having different output specifications, giving rise to the need of various kinds of metal molds.

Further, as to the mandrel too, there arises a problem such that a unique mandrel is necessary for the rotor core having a different length. In casting a rotor core, a mandrel system is generally known as means for fixing the laminated steel sheet piled up to each other. In the mandrel system, since the upper and lower ends of the laminated steel sheet in the axial direction are gripped by the fastening members, and the mandrel for fixing is used as a jig for applying a pressure for fixing, the different fixing mandrels are necessary for the different kinds of rotor core differing in axial length. Further, since the fixing mandrel requires a long time for being removed, it is difficult to use one fixing mandrel in rotation for mass production of the rotor cores, so that the number of fixing mandrels corresponding to the number of the rotor core to be cast will be needed. As a result, there arises a problem that it is necessary to supply a number of fixing mandrels.

Further, in fixing the cast rotor core to the output shaft of the induction motor, there is a problem such that the treatment for the inner periphery of the rotor core is necessary. In the case where laminated steel sheets is stacked on the mandrel so as to form the rotor core, in general, there is a clearance (d in FIG. 15(c)) resulting from a gap between the sleeve diameter of the mandrel and the inner periphery of the laminated steel sheet due to the operability of the stack, so that the bore of the rotor core is hard to be aligned at a time. When mounting the rotor core to the outputted shaft of the induction motor, the rotor core is usually fixed by shrinkage fit. Accordingly, if the rotor core is mounted without aligning the bore of the rotor core by the inner periphery treatment, the output shaft may be curved, or the initial balance of the rotor may be adversely affected.

DISCLOSURE OF THE INVENTION

An object of the present invention is to reduce the kinds and number of jigs such as metal molds, mandrels and the like necessary for casting, thereby improving the performances of the jigs and manufacturing efficiency and quality of the rotor core.

More particularly, an object of the invention is to provide a method and an apparatus for casting a conductor of a cage rotor of an induction motor designed for reducing the kinds of the metal mold necessary for casting the cage rotors coping with many kinds of output specifications. Another object is to reduce the kinds of the mandrel necessary therefor. Further, another object is to reduce the time required for operation using the mandrel and reduce the number of the mandrels necessary therefor. Further, another object is to provide a method and an apparatus for casting the conductor of the cage rotor of the induction motor, which do not need the bore working of the rotor core.

In order to achieve the above objects, in accordance with the present invention, there is provided an apparatus for casting a conductor of a cage rotor of an induction motor comprises a casting mold provided with a recess portion for receiving a rotor core formed by piling up steel sheets and restraining a motion of the rotor core in a radial direction, and a holding portion moving toward an end surface of the rotor core housed in the recess portion of the casting mold by means of drive means and acts on the end surface so as to fix the axial motion of the rotor core, wherein molten metal is poured into a plurality of slots formed in the rotor core fixed by the recess portion and the holding portion so as to form a plurality of conductor rods and a pair of end rings communicating the ends of the conductor rods with one another, wherein a moving amount of the holding portion can be adjusted in correspondence to an axial length of the rotor core.

Alternatively, the holding portion is structured to comprise a cylinder moving toward the end surface of the rotor core by means of the drive means and a pressing member connected to the cylinder and acting on the end surface of the rotor core by a motion of the cylinder, and the pressing member is selected so that it may have an axial dimension corresponding to the axial length of the rotor core and is mounted on the cylinder. Otherwise, the casting mold may be designed to be common while the cylinders and pressing member may be replaced to cope with the axial length of the core.

Preferably, the pressing member comprises a cup-shaped member having an axial dimension corresponding to the axial length of the rotor core, or comprises a combination of a cup-shaped member having a constant axial dimension and a spacer having an axial dimension corresponding to the axial length of the rotor core. Further, for the rotor required to have a higher casting quality, a double cylinder can be employed for enabling application of localized pressure. Even when the double cylinder is employed, all the function of the single cylinder mentioned above can be realized.

Preferably, the apparatus for casting the conductor is provided with a first mandrel as an accessory whose thermal expansion rate is larger than that of the steel sheets constituting the rotor core, whose axial dimension is not shorter than that of the rotor core and which has a sleeve portion provided with heating means in its inside, and the first mandrel is heated by the heating means after being inserted into the central opening of the rotor core prior to being received within the recess portion of the casting mold, whereby an unevenness of the inner periphery of the central opening of the rotor core is leveled by the thermal expansion of the sleeve.

Preferably, the apparatus for casting the conductor is provided with a second mandrel as an accessory which comprises a shaft portion having an outer diameter allowable for being inserted into the central opening of the rotor core, a supporting portion disposed on one end of the shaft portion and a shoulder portion having a diameter larger than the outer diameter of the shaft portion disposed on the other end of the shaft portion. When the second mandrel is inserted into the central opening of the rotor core received in the recess portion of the casting mold, and the casting is completed, the rotor core is removed out of the recess portion of the casting mold together with the second mandrel by being held by the supporting member of the second mandrel.

Preferably, the casting mold is provided with a plurality of air vents in an axial direction on the inner surface of the recess portion which houses the rotor core.

Further, in accordance with the invention, there is provided a method for casting a conductor of a cage rotor of an induction motor comprises steps of, (a) laminating steel sheets to a predetermined thickness by passing a central opening of the steel sheets through a sleeve portion of a mandrel, (b) leveling an unevenness of inner periphery of a central opening of the laminated steel sheets occurred during laminating process by the effect of thermal expansion of said sleeve resulting from being heated, (c) pressing said laminated steel sheets in the axial direction and temporarily fixing the outer periphery thereof so as to form the rotor core, (d) housing said rotor core in the recess portion of the casting mold formed in the conductor casting apparatus, (e) adjusting an axial dimension of the holding portion or a stroke of the holding portion acting on an axial end of said rotor core, to axial dimension of said rotor core, and (f) forming a plurality of conductor rods and a pair of end rings communicating ends of the conductor rods with one another by supplying molten metal into a plurality of slots formed in the rotor core which is held by said holding portion.

It is preferable to add between the above Steps (c) and (d) a step of inserting a mandrel provided with a shaft portion having an outer diameter allowable for being inserted into the central opening of the rotor core, an end portion with a supporting portion disposed at an end of the shaft portion and a shoulder portion having a diameter larger than the outer diameter of said shaft portion disposed at the other end of the shaft portion, and to add after said Step (f) a step for removing, by using said mandrel, the rotor, with which a plurality of conductor rods and a pair of end rings are formed in the rotor core, from the casting mold.

According to the invention, in a method for casting a conductor of a cage rotor of an induction motor and an apparatus for casting the same, kinds and number of jig such as metal molds, mandrels and the like necessary for casting can be reduced, a performance of the jigs can be improved and manufacturing efficiency and quality of rotor core can be improved.

Further, in casting cage rotors to cope with various output specifications, the kinds of the metal mold and the mandrel necessary for casting can be reduced, time required for operation using the mandrels and the number of the mandrel necessary for casting can be reduced. Still further, casting the conductor of the cage rotor of the induction motor can be performed without requiring bore working of the rotor core.

BRIEF DESCRIPTION OF DRAWINGS

FIG. 3(a) is a partial cross sectional view as seen from an a—a section of FIG. 3(b);

FIG. 7 is a schematic view showing one form of the mandrel to be inserted into the rotor core for carrying the rotor core to the conductor casting apparatus and removing the rotor core, in which the conductor rod and the end rings are formed, from the conductor casting apparatus;

BEST MODE FOR CARRYING OUT THE INVENTION

Figure 1:
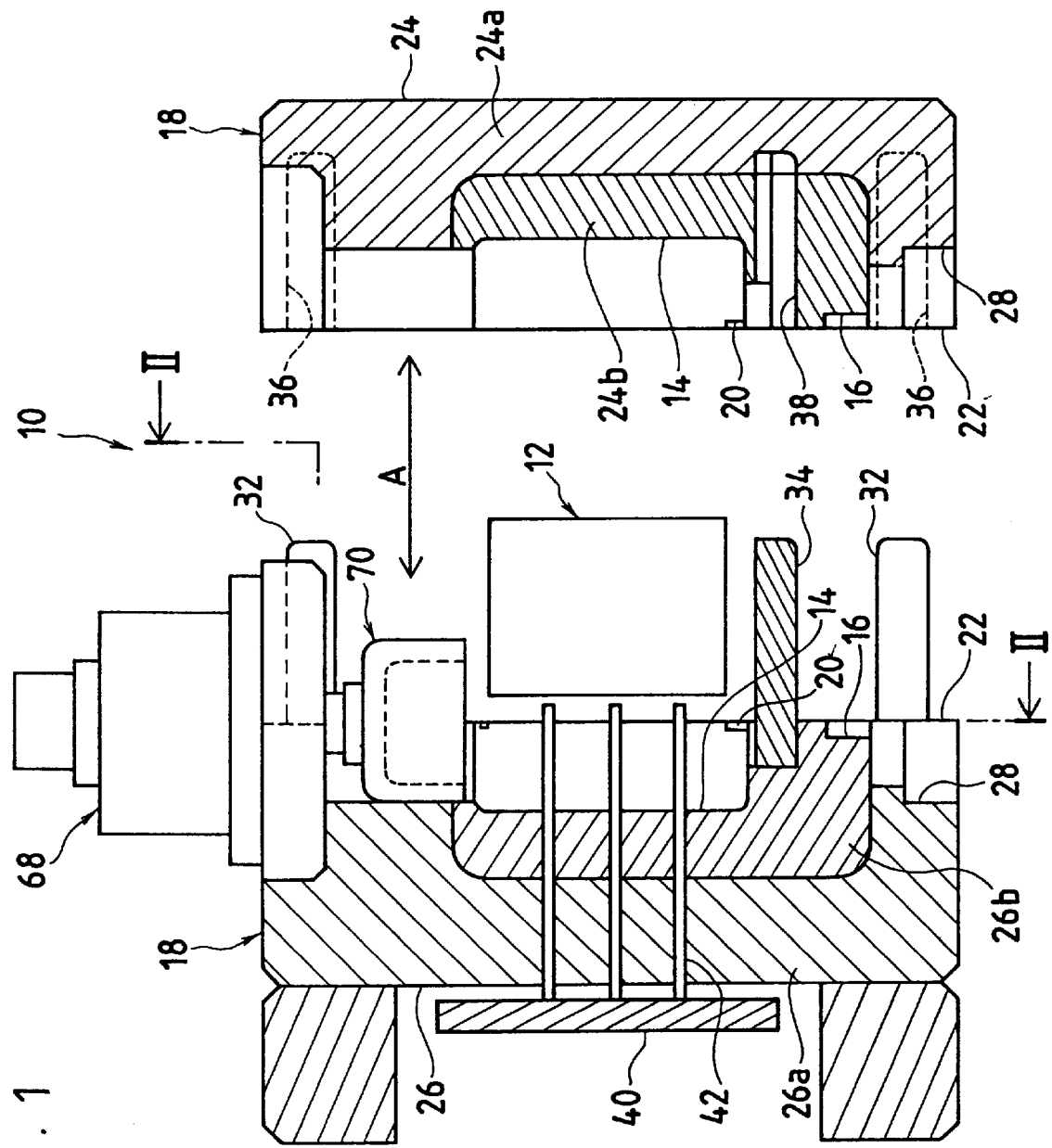
FIG. 1 is a schematic view showing an embodiment of an apparatus for casting a conductor of a cage rotor of an induction motor in accordance with the present invention.

An embodiment of an apparatus for casting a conductor of a cage rotor of an induction motor in accordance with the present invention will be described below with reference to FIG. 1, FIG. 2(a) and FIG. 2(b).

A conductor casting apparatus 10, is provided with a casting mold 18 having a recess portion 14 for housing a rotor core 12 of a cage rotor and a sprue 16 communicating with the recess portion 14. The recess portion 14 and the sprue 16 are connected by a runner 20 substantially symmetrically branched in two directions. The casting mold 18 is divided into a fixed mold 24 and a movable mold 26 by a parting plane 22 extending in a vertical direction (in a vertical direction in FIG. 1). The movable mold 26 is movable either way in a horizontal direction (in a horizontal direction shown by an arrow A in the drawing) with respect to the fixed mold 24. Therefore, the casting mold 18 is designed to be separated and joined in a radial direction of the rotor core 12.

The metal mold comprises the fixed mold 24 and the movable mold 26. Further, the fixed mold 24 and the movable mold 26 respectively comprise main molds 24a and 26a, and sub-molds 24b and 26b structured to be inserts for the main molds 24a and 26a. The recess portion 14, the sprue 16 and the runner 20 are recessed towards the fixed mold 24 and the movable mold 26 from the parting plane 22 in a manner such that they have substantially the same shapes so that when the both molds 24 and 26 are joined, a single casting mold cavity and a single sprue system are constituted. In this case, the recess portion 14, the sprue 16 and the runner 20 are formed in the sub molds 24b and 26b.

The sprue 16 is disposed immediately below the recess portion 14, and the runner 20 is opened to a peripheral wall of a lower end of the recess portion 14. A receiving portion 28 is formed in the main molds 24a of the fixed mold 24 and the main mold 26a of the movable mold 26 respectively disposed below the sprue 16, and an injection front end (not shown) of a casting machine such as a die casting machine or the like is mounted on the receiving portion 28. Further, a plurality of air vent (a first air vent 15 and a second air vent 17) for allowing gas to escape from a cavity during casting are formed along the parting plane 22 in the fixed mold 24 and the movable mold 26. The air vents extend through the main molds 24a and 26a and the sub molds 24b and 26b, one end of each vent opening to an upper peripheral wall or an inner peripheral wall of the recess portion 14 and the other end thereof opening to the open air through chill vents (a first chill vent 30 and a second chill vent 31) formed in the main molds 24a and 26a.

The movable mold 26 is provided with a plurality of guide pins 32 projecting from the parting plane 22 of the main mold 26a and a core supporting rail 34 projecting from the parting plane 22 of the sub mold 26b. Further, the fixed mold 24 is provided with a guide groove 36 and a rail receiving groove 38 which are recessed from the parting plane 22 at positions corresponding to the positions of the guide pin 32 and the core supporting rail 34. Still further, the movable mold 26 is provided with a pushing sheet 40 and a plurality of pushing pins 42 for pushing out the rotor core 12, formed with the conductor, from the recess portion 14.

Figure 3A:
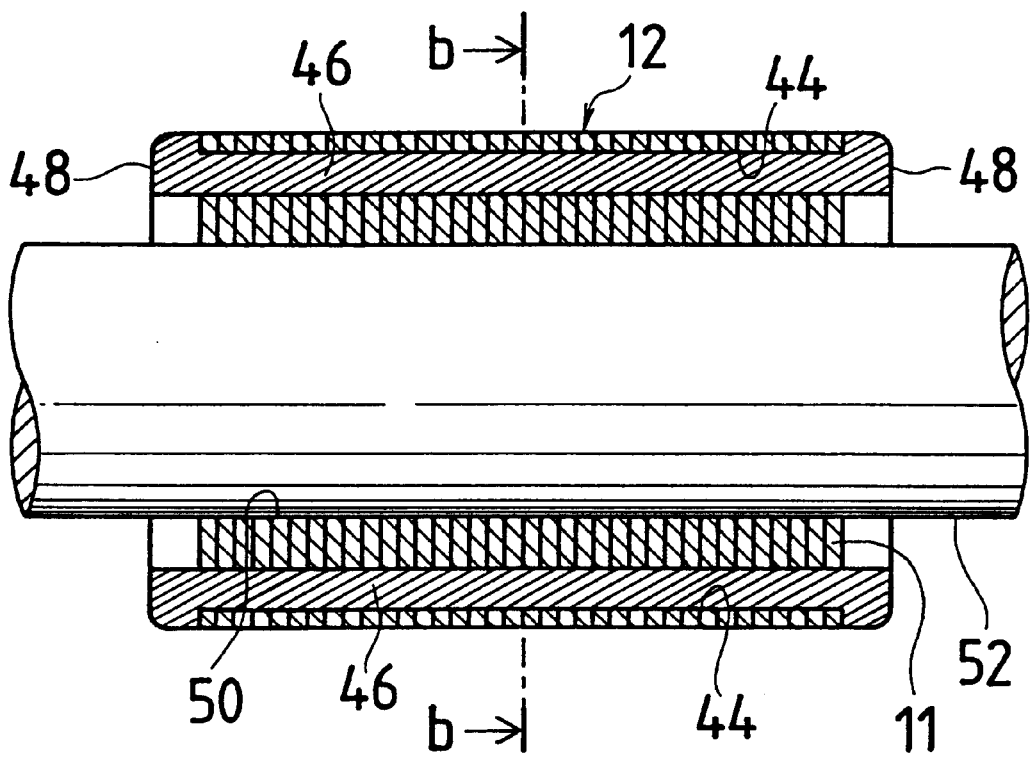
FIG. 3(a) is a schematic view showing that the cage rotor is formed by shrinkage fitting the rotor core having conductor rods formed by the conductor casting apparatus shown in FIG. 2(a) and an end ring connecting the ends of the conductor rods with one another, to the shaft for fixation.
Figure 3B:
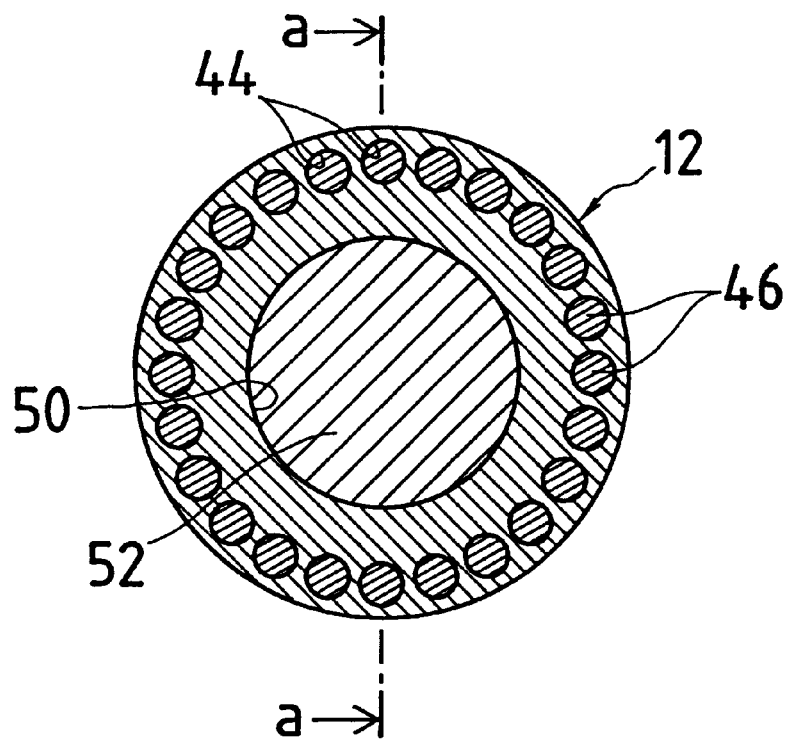
FIG. 3(b) is a cross sectional view as seen from a b—b section of FIG. 3(a)

Next, the rotor core 12 of the cage rotor will be described below with reference to FIG. 3(a) and FIG. 3(b).

The rotor core 12 is constituted of a laminated body made of a magnetic steel sheet such as a silicon steel sheet 11 and the like, and is provided with a conductor rod 46 formed within each of a plurality of slots 44 formed axially extending along an outer peripheral portion having a substantially cylindrical shape, and a pair of end rings 48 formed on both axial ends of the rotor core 12 to connect the plurality of conductor rods 46 one another. The plurality of conductor rods 46 and the pair of end rings 48 are integrally formed by a casting such as an aluminum die casting and the like using a conductor casting machine 10. The rotor core 12 having the integrally formed conductor portion is fixed to a shaft 52 in a central cylindrical opening 50 by a shrinkage fit and the like to form a known cage rotor.

The rotor core 12 is disposed in the recess portion 14 of the casting mold 18 in a manner such that it is supported by a mandrel 54 (hereinafter referred to as a simple mandrel) shown in FIG. 2(a). The simple mandrel 54 is provided with a shaft portion and a shoulder portion, the shoulder portion being disposed in a base of the lower end of the shaft portion and having a diameter larger than an outer diameter of the shaft portion, and is a jig for carrying the rotor core 12 by inserting the shaft portion into the open hole in the axial core portion of the rotor core 12 and supporting the lower end portion of the rotor core 12 by means of the shoulder portion. It is sufficient for the simple mandrel 54 to have at least a function for carrying the rotor core 12, and the outer diameter of the shaft portion of the simple mandrel 54 needs to be determined so that a clearance can be provided for allowing the insertion of the shaft portion into the rotor core 12. Further, the simple mandrel 54 has a lower end portion projecting downward, and is engagedly inserted into a pair of guide projections 62 of the core supporting rail 34 of the movable mold 26, whereby the simple mandrel 54 and the rotor core 12 are slidably supported by the core supporting rail 34. Still further, a ring-shape supporting member for moving the simple mandrel itself 54 or the simple mandrel and the rotor core 12 supported thereby is provided on the upper end of the simple mandrel 54.

Figure 2A:
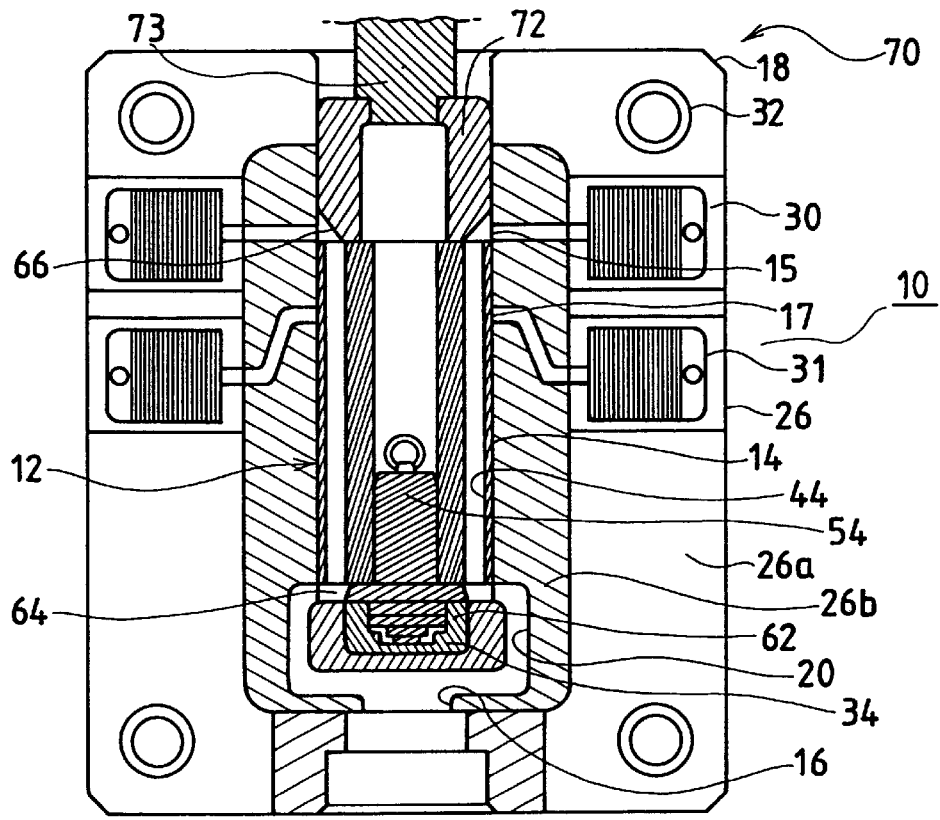
FIG. 2(a) is a schematic view showing a state in which a rotor core is housed in a recess portion of a casting mold of the apparatus for casting the conductor of the cage rotor in accordance with the invention and is fixed by a holding portion.
Figure 2B:
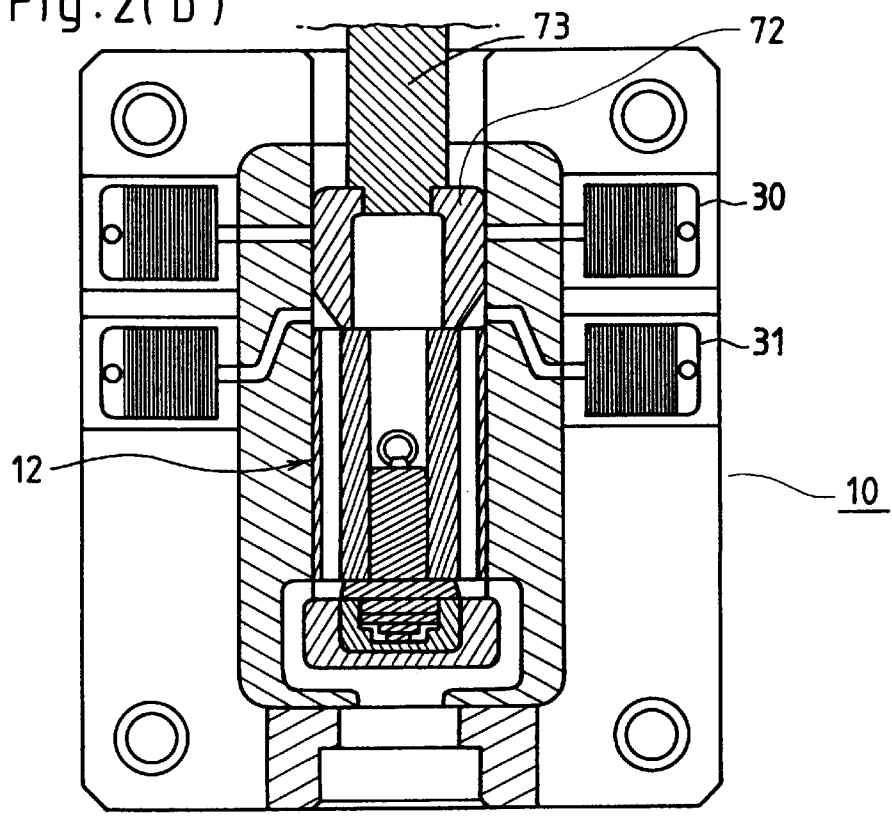
FIG. 2(b) is a schematic view showing a state in which a moving stroke of a piston of the holding portion is enlarged by the fact that a rotor core having a short axial dimension is housed in the recess portion of the casting mold of the conductor casting apparatus shown in FIG. 2(a)

The rotor core 12 supported, with its axis being kept vertical, by the simple mandrel 54 is mounted on the core supporting rail 34 of the movable mold 26 as shown in FIG. 1 and FIG. 2(a).

When the rotor core 12 supported by the simple mandrel 54 is inserted into the recess portion 14 of the movable mold 26, and the movable mold 26 is moved to be joined to the fixed mold 24, the rotor core 12 is housed in a predetermined position within the recess portion 14, with the outer peripheral surface thereof being substantially closely and evenly in contact with the peripheral wall of the recess portion 14. In this case, in the lower end region of the recess portion 14, a first annular end ring cavity 64 for forming the end ring 48 is defined among the axial end surface of the rotor core 12, the outer peripheral surface of the shoulder portion of the base of the simple mandrel 54 and the wall surface of the recess portion 14. In a similar manner, in the upper end of the recess portion 14, a second annular end ring cavity 66 for forming the end ring 48 is defined among the axial end surface of the rotor core 12, the outer peripheral surface of a cup 72 (described later) and the wall surface of the recess portion 14. The first end ring cavity 64 and the second end ring cavity 66 communicate with a plurality of slots 44 of the rotor core 12.

The conductor casting apparatus 10 is further provided with a holding portion 70 for fixing and holding the rotor core 12 within the recess portion 14 by bringing its end portion into contact with the upper end portion of the rotor core 12. The holding portion 70 is designed to be capable of moving and adjusting in the direction toward the end portion of the rotor core 12. The holding portion 70 shown in FIG. 2(a) comprises the cup 72 for holding, fixing and pressing the rotor core 12 by being brought into contact with the upper end of the rotor core 12 and a cylinder 73 for driving the cup 72. The movement of the holding portion 70 toward the end portion of the rotor core 12 is controlled by adjusting the stroke length of the cylinder 73. In the case of FIG. 2(a), since the axial dimension of the rotor core 12 is relatively long, the stroke of the cylinder is adjusted to be relatively short. In the case of FIG. 2(b), since the axial dimension of the rotor core 12 is relatively short, the stroke of the cylinder is adjusted to be relatively long.

When the cylinder 73 is moved towards the rotor core 12 side, the cup 72 is brought into contact with the upper end of the rotor core 12 within the recess portion 14 so as to press the rotor core 12. As a result, the rotor core 12 is held in a predetermined position within the recess portion 14 between the cup 72 and the core supporting rail 34.

Further, the axial end surface of the cup 72 defines the second end ring cavity 66, and applies pressure to the molten iron filled in the second end ring cavity 66.

Next, a procedure for constructing the rotor core 12 by piling up the laminated steel sheets 11, prior to the casting operation by means of the conductor casting apparatus 10, will be described below with reference to FIG. 5(a) to FIG. 5(e) and FIG. 6(a) to FIG. 6(d).

In order to stack the laminated steel sheets 11, a mandrel 80 (hereinafter referred to as an open mandrel) as shown in FIG. 6(d) is used. The open mandrel 80 is provided with a sleeve portion 80a and a shoulder portion 80b for supporting the laminated steel sheets 11 stacked to each other. A thermal expansion rate of the sleeve portion 80a is larger than that of the laminated steel sheet 11, and the sleeve portion 80a has an axial length larger than the axial length of the rotor core 12 formed by piling up. The open mandrel is provided with heating means such as a heater 82 and the like and cooling means such as a cooling pipe passage 84 and the like. When heated by the heater 82, the sleeve portion 80a expands in the radial direction and presses the laminated steel sheets 11 along their inside peripheries so as to straighten the inner peripheral surface of the rotor core 12. Further, when cooled by the cooling pipe passage 84, the diameter of the sleeve portion 80a is shrunk in its radial direction forming a gap between the outer peripheral surface of the sleeve portion 80a and the inner peripheral surface of the rotor core 12. As a result, the rotor core 12 is opened forming so as to be pulled out from the open mandrel 80.

Figure 4:
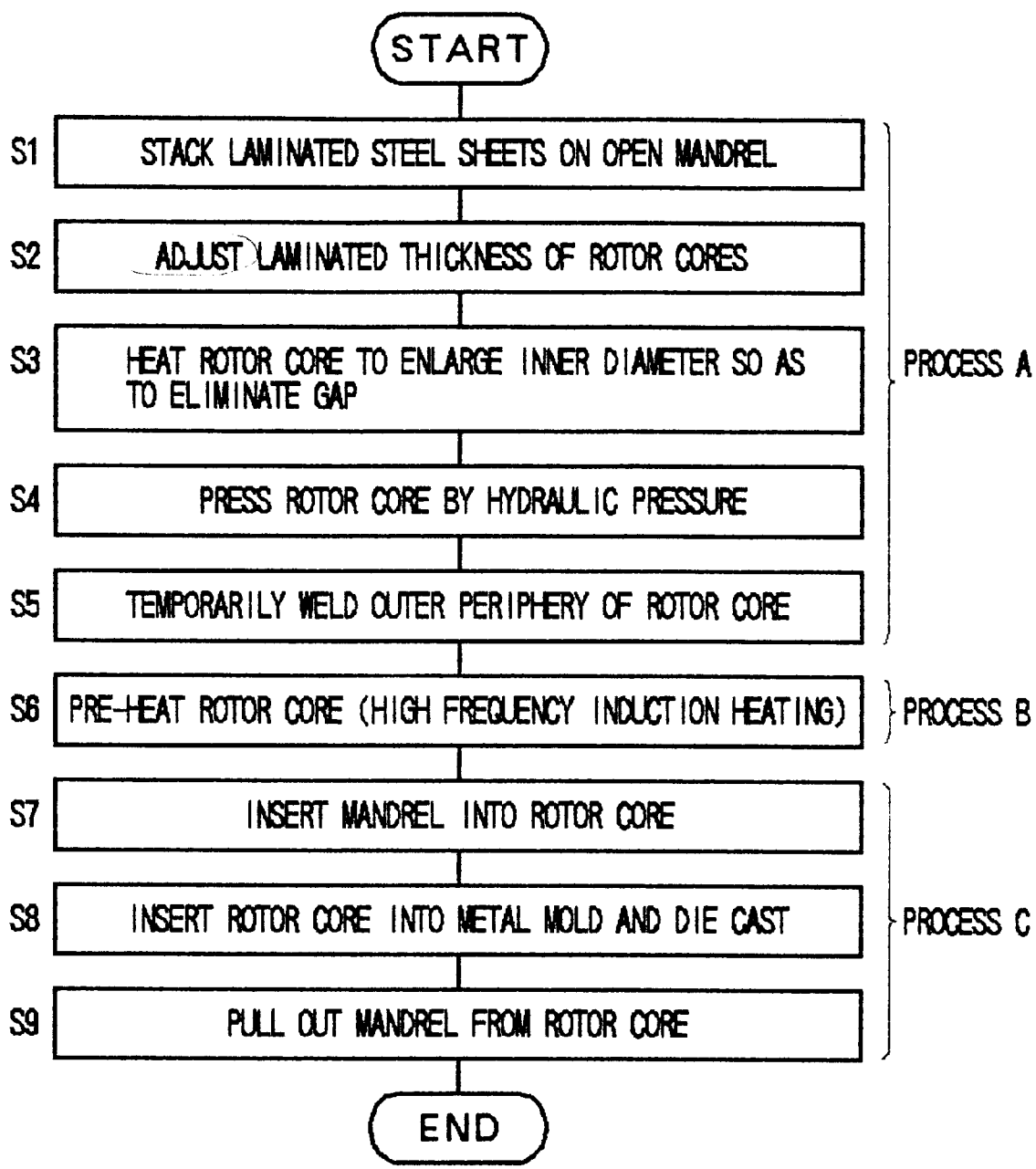
FIG. 4 is a flow chart showing a series of steps comprising a step of forming the rotor core by laminating the steel sheets, a step of forming a conductor portion (the conductor rod and the end ring) in the rotor core by the conductor casting apparatus and a step of removing the rotor in which the conductor portion is formed on the rotor core from the conductor casting apparatus.

Next, a procedure for integrally forming the conductor portion on the rotor core 12 by means of the conductor casting apparatus 10 having the above structure will be described with reference to the flow chart shown in FIG. 4. In this procedure, the conductor casting is mainly divided into a process of constituting the rotor core 12 by the laminated steel sheets (a process A), a process of pre-heating the rotor core 12 (a process B) and a process of die casting the rotor core 12 in the conductor casting apparatus 10 (a process C).

Figure 5:
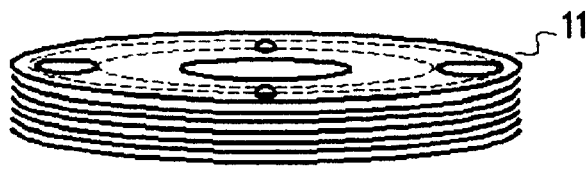
FIG. 5(a) is a schematic view showing a state in which the steel sheets are laminated.
FIG. 5(b) is a schematic view showing a state in which the mandrel is inserted into the central opening of the laminated steel sheets.
FIG. 5(c) is a top plan view showing the state of FIG. 5(b)
FIG. 5(d) is a schematic view showing a state in which a thermal expansion is effected to the mandrel shown in FIG. 5(b) and FIG. 5(e) is a top plan view showing the state of FIG. 5(d)
Figure 5:
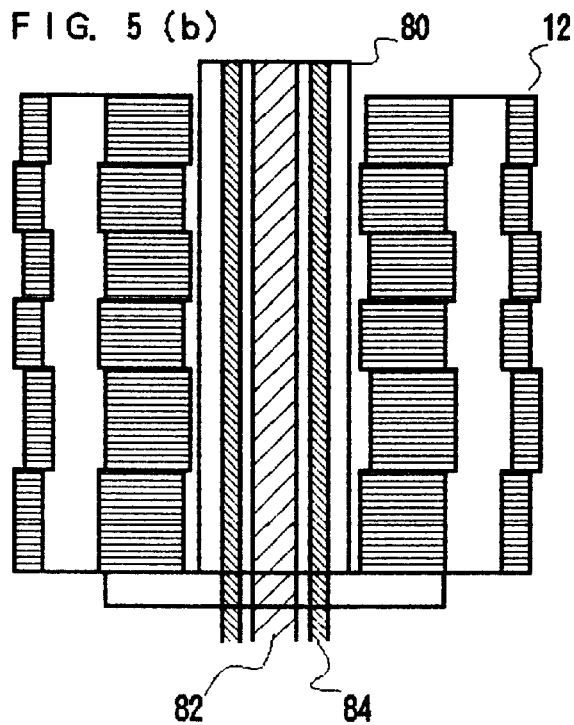
Figure 5:
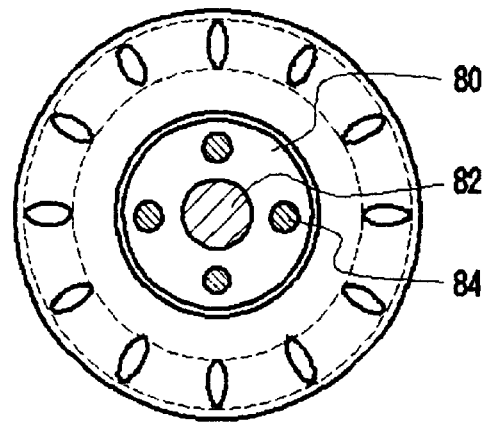
Figure 5:
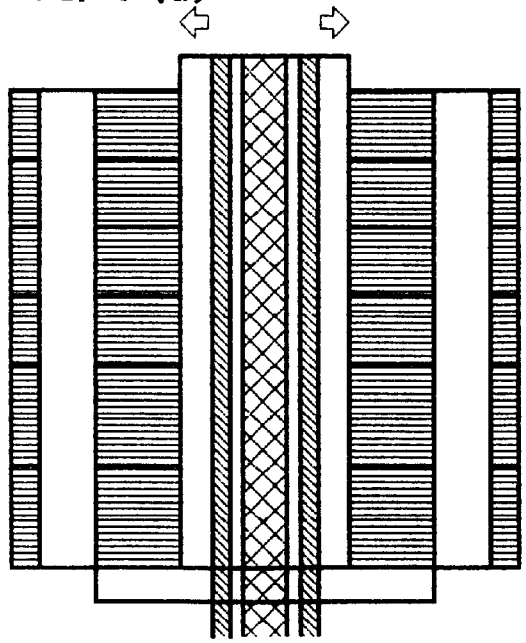
Figure 5:
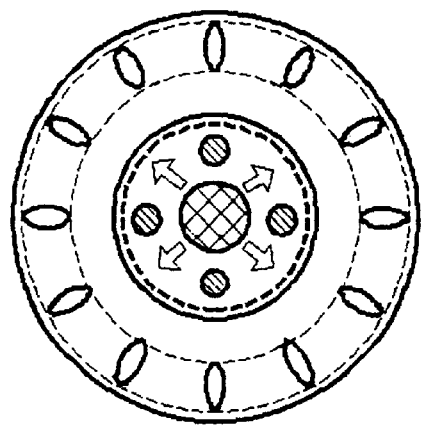

In the process A, as shown in FIG. 5(*b*), first the laminated steel sheet 11 (FIG. 5(*a*)) are provided with central openings and are passed by the sleeve portion 80*a* of the open mandrel 80 for enabling the laminated sheets to be piled up (Step S1) to form the rotor core 12, and then the overall thickness of the lamination is adjusted (Step S2). The adjustment of the lamination thickness can be made by an automatic lamination thickness adjusting apparatus. The laminated steel sheet 11 is not completely aligned leaving some unevenness as to the inner peripheral surface, as schematically shown in FIG. 5(*b*). The gap between the laminated steel sheet 11 and the sleeve portion 80*a* of the mandrel 80 is, for example, about 50 μm.

After forming the rotor core 12 by accumulating the laminated steel sheets 11, the heater 82 of the open mandrel 80 is operated to heat the open mandrel 80 (Step S3). The open mandrel 80 and the rotor core 12 is expanded by this heating. When the thermal expansion rate of the open mandrel 80 is set to be larger than the thermal expansion rate of the laminated steel sheets 11, the outer peripheral surface of the sleeve portion 80*a* is brought into contact with the inner peripheral surface of the central hole of the laminated steel sheets 11 by the radial expansion of the sleeve portion 80*a* of the open mandrel 80, and further presses the inner peripheral surface of the central hole of the laminated steel sheets 11 outward in the radial direction. For example, when a stainless steel is used for the sleeve portion 80*a* of the open mandrel 80, a linear expansion rate of the stainless steel is $16.4 \times 10^{-6}$, whereas a linear expansion rate of the material constituting the laminated steel sheets 11 is $11.7 \times 10^{-6}$. Thus, supposing that the gap between the central hole of the laminated steel sheet 11, having an inner diameter of Φ60, and the sleeve portion 80*a* is 50 μm, if they are heated to about 200° C. the diameter of the open mandrel 80*a* increases 57 μm even after subtracting the increase in the inner diameter of the laminated steel sheet 11, so that the gap of 50 μm before heating is exceeded causing the open mandrel 80*a* to press the inner peripheral surface of the laminated steel sheets 11 outward in the radial direction by an amount corresponding to the difference of the expansion. As a result, the inner periphery of the rotor core 12 is aligned by being pressed by amount of 7 μm.

FIG. 5(*d*) and FIG. 5(*e*) schematically illustrate a state that the unevenness on the inner peripheral surface of the rotor core 12 is canceled by the expansion of the sleeve portion 80*a* of the open mandrel 80. Further, the open mandrel 80 may be of either an oil hydraulic type or a mechanical type in addition to the type utilizing the thermal expansion. However, in the case of the thermal expansion type, the dispersion of the partial expansion is relatively small, so that the alignment of the inner periphery can better be accomplished, and further, since the structure can be made simple, it is better in terms of the maintenance and durability.

After aligning the inner peripheral surface of the rotor core 12, the rotor core 12 is pressed in the axial direction by the hydraulic pressure and the like to remove the gap between the respective laminated steel sheet 11 (Step S4), and further the outer peripheral surface of the rotor core 12 is temporarily welded (Step S5), thereby preventing mutual friction among the lamination of rotor core 12. The temporary welding of the outer peripheral surface of the rotor core 12 can be performed, for example, by axially welding several portions (three to four portions) of the outer periphery of the rotor core 12 by means of a YAG laser and the like (referred to as a welded portion 86 in FIG. 6(*c*)). The temporary welding can be accomplished by mounting a processing nozzle on a processing robot and applying a laser beam having a capacity of about 500 watt for about three minutes. Further, the fixing of the laminated steel sheets can be made by caulking as well.

Figure 6:
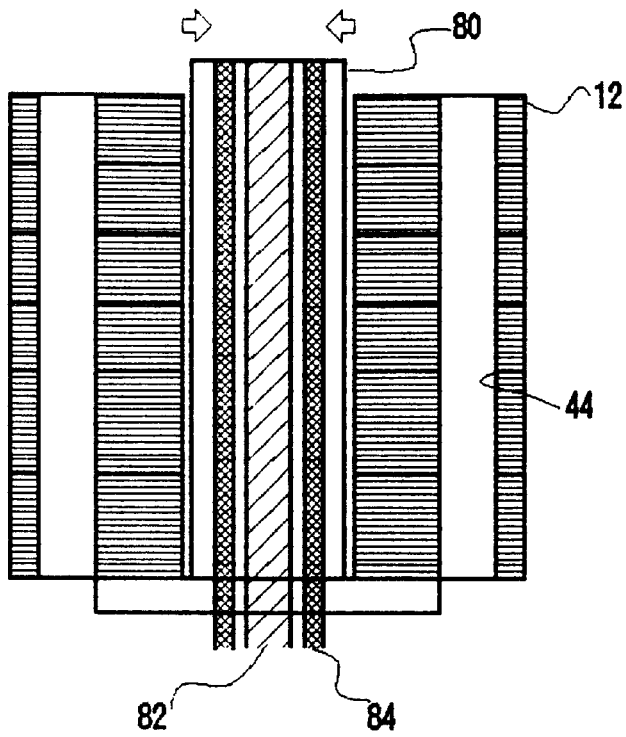
FIG. 6(a) is a schematic view showing a state in which the mandrel shown in FIG. 5(d) is cooled.
FIG. 6(b) is a top plan view showing the state of FIG. 6(a)
FIG. 6(c) is a schematic view showing a state in which the mandrel is pulled out from the state of FIG. 6(a)
FIG. 6(d) is a perspective view of the mandrel.
Figure 6:
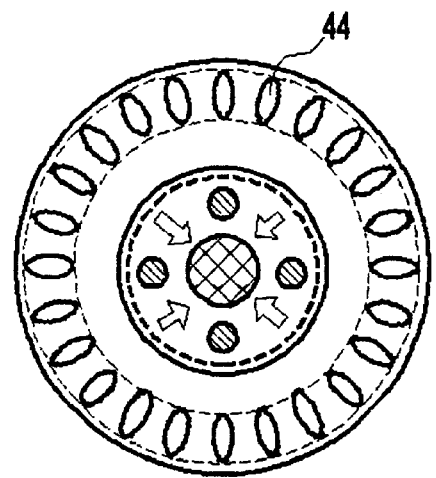
Figure 6:
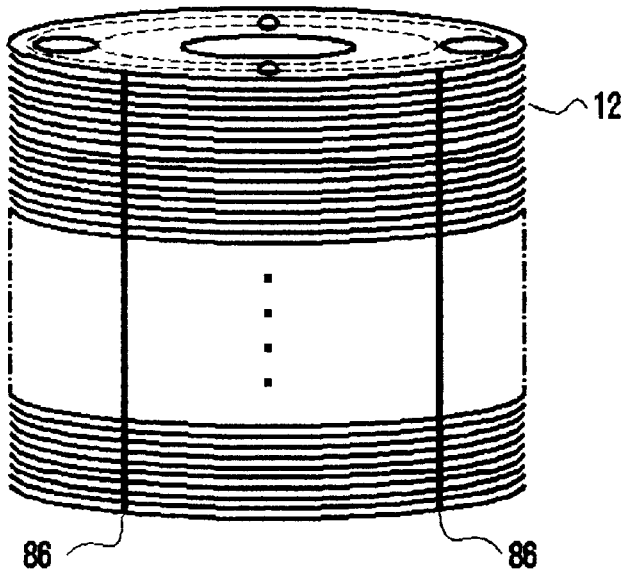
Figure 6:
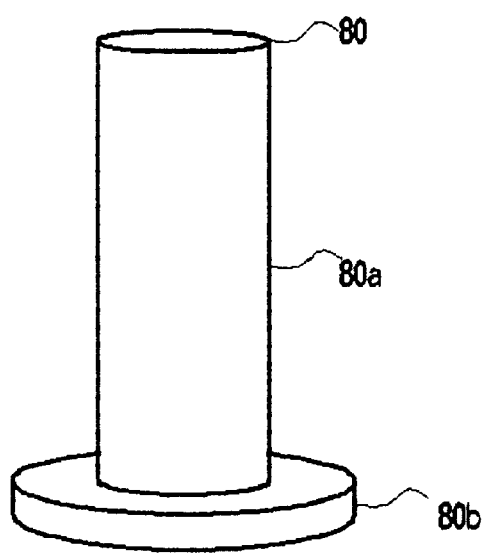

FIG. 6(*a*) and FIG. 6(*b*) show a state that the open mandrel 80 is cooled and a gap is formed between the outer peripheral surface of the sleeve portion 80*a* and the inner peripheral surface of the rotor core 12. In this state, the laminated rotor core 12 can be taken out from the open mandrel 80. The cooling of the heated open mandrel 80 can be performed by passing a cooling fluid and the like (an oil cooling and a water cooling) through the cooling pipe passage 84. Further, cooling means other than the cooling pipe passage 84 or a natural cooling not using the cooling means may be employed.

Further, FIG. 6(*c*) shows a state that the open mandrel 80 is taken out from the rotor core 12 shown in FIG. 6(*a*), and FIG. 6(*d*) shows the open mandrel 80 thus taken out. Further, the temporary welding by the laser beam or the like is performed on the outer peripheral surface of the rotor core 12 shown in FIG. 6(*c*) to form the welded portion 86.

In process B, following the completion of the process A, the rotor core 12 is pre-heated for casting (Step S6). The pre-heating can be performed, for example, by high frequency induction heating means.

After pre-heating the rotor core 12 in the process B, the die casting is performed for the rotor core 12 by the conductor casting apparatus 10 in the process C. The process C will be described below with reference to FIG. 7.

First, in order to transfer the rotor core 12 heated in the process B to the conductor casting apparatus 10, the simple mandrel 54 having the form shown in FIG. 7 is mounted on the rotor core 12. The simple mandrel 54 is provided with a sleeve portion 54*a* having an outer diameter capable of being inserted into the central opening 50 of the rotor core 12, a base 58 with a shoulder portion for holding the rotor core 12 by being brought into contact with the lower end portion of the rotor core 12, and a supporting portion 56 capable of being used for transferring only the simple mandrel 54 or the simple mandrel 54 mounted on the rotor core 12. Mounting the rotor core 12 on the simple mandrel 54 can be accomplished by inserting the sleeve portion 54*a* of the mandrel into the central opening 50 of the rotor core 12 by using the support tool 56 and the like. Further, by using the supporting portion 56 and the like, the rotor core 12 can be transferred together with the simple mandrel 54.

In the conductor casting apparatus 10, the casting mold 18 is opened, and the cylinder 73 of the holding portion 70 is retreated so that the cup 72 is disposed in the retreated position. Next, the rotor core 12 held by the simple mandrel 54 is transferred to the casting mold 18 and is axially vertically mounted on the front end portion of the core supporting rail 34 of the movable mold 26. In this state, the movable mold 26 is moved to be assembled to the fixed mold 24, whereby the rotor core 12 is housed within the recess portion 14, and the rotor core 12 is inserted into the recess portion 14 of the fixed mold 24 in accordance with the motion of the movable mold 26. Then, the rotor core 12 is pushed by the wall of the recess portion 14 of the fixed mold 24 so as to be guided on the core supporting rail 34. Further, by completely assembling the movable mold 26 to the fixed mold 24, the rotor core 12 is inserted into the recess portion 14 of the movable mold 26 (Step S7; FIG. 7(c)).

After the movable mold 26 is assembled to the fixed mold 24 and the rotor core 12 is housed within the recess portion 14, the cylinder 73 is advanced (descended) so that the rotor core 12 is fixed between the cup 72 and the core supporting rail 34. In this case, when the stroke of the cylinder 73 is set to be equal to the shortest axial length of the rotor cores 12, both the metal mold and the mandrel can be one kind with respect to the rotor core 12 whose axial length is variable. FIG. 2(a) shows the case that the axial length of the rotor core 12 is relatively long, and FIG. 2(b) shows the case that the axial length of the rotor core 12 is relatively short. By setting the stroke of the cylinder 73 to be capable of adapting a relatively short axial length of the rotor core 12 as in FIG. 2(b), the casting can be performed with the same structure irrespective of the axial length of the rotor core 12.

In this state, the injector front of the casting machine such as the die casting machine and the like is mounted into the receiving portion 28 (FIG. 1) so that the molten metal can be poured into the sprue 16. The molten metal poured under a predetermined pressure flows into the first end ring cavity 64 through the runner 20 and fills the conductor forming cavity within the plurality of slots 44 of the rotor core 12. In this case, the gas within the conductor forming cavity escapes from the casting mold 18 through the air vent and the chill vent. In this case, a plurality of air vents and chill vents (the first air vent 15, the second air vent 17, the first chill vent 30 and the second chill vent 31) provided along the axial length of the rotor core 12 in the axial direction efficiently allow the gas to escape even in the case of casting of the rotor core 12 having a different axial length. Further, when the vacuum pump is connected to the chill vent to draw the gas within the metal mold, the casting with less blowholes can be obtained. The molten metal fills the conductor forming cavity within the plurality of slots 44 and, thereafter, flows into the second end ring cavity 66 (Step S8; FIG. 7(c)).

After the plurality of conductor rods 46 and the pair of end ring 48 of the rotor core 12 are formed, the cylinder 73 is retreated (ascended) so as to separate the cup 72 from the rotor core 12. Further, the movable mold 26 is moved to open the casting mold 18, and the pushing sheet 40 is operated to push out the rotor core 12 to the front end portion of the core supporting rail 34 by means of the pushing pin 42 (FIG. 7(d)).

Thereafter, the gate portion 60 at which one of the end ring 48 and the molten metal solidified within the molten metal passage 20 are connected is cut to be separated (FIG. 7(e)), and the simple mandrel 54 is pulled out from the rotor core 12 (Step S9 and FIG. 7(f)). This will complete the forming of the conductor of the rotor. The drawn-out simple mandrel 54 is reused of forming the conductor of the next rotor core 12.

Since the simple mandrel 54 can be reused by rotation irrespective of the axial length of the rotor core 12, it is not necessary to prepare many kinds of mandrels in accordance with various axial lengths of the rotor core 12, and, further, the necessary number thereof can be minimized in accordance with the cycle for casting operation.

As described above, the holding portion 70 provided in the conductor casting apparatus 10 adjusts the stroke of the cylinder 73 corresponding to the difference in the axial dimension of the rotor core 12. Next, another means for corresponding to the difference in the axial dimension of the rotor core 12 will be described below with reference to FIG. 8(a), FIG. 8(b), FIG. 9(a) and FIG. 9(b). In this case, only the portions different from the structure explained in the embodiment mentioned above will be described, and the explanation of the common portions will be omitted.

Figure 8A:
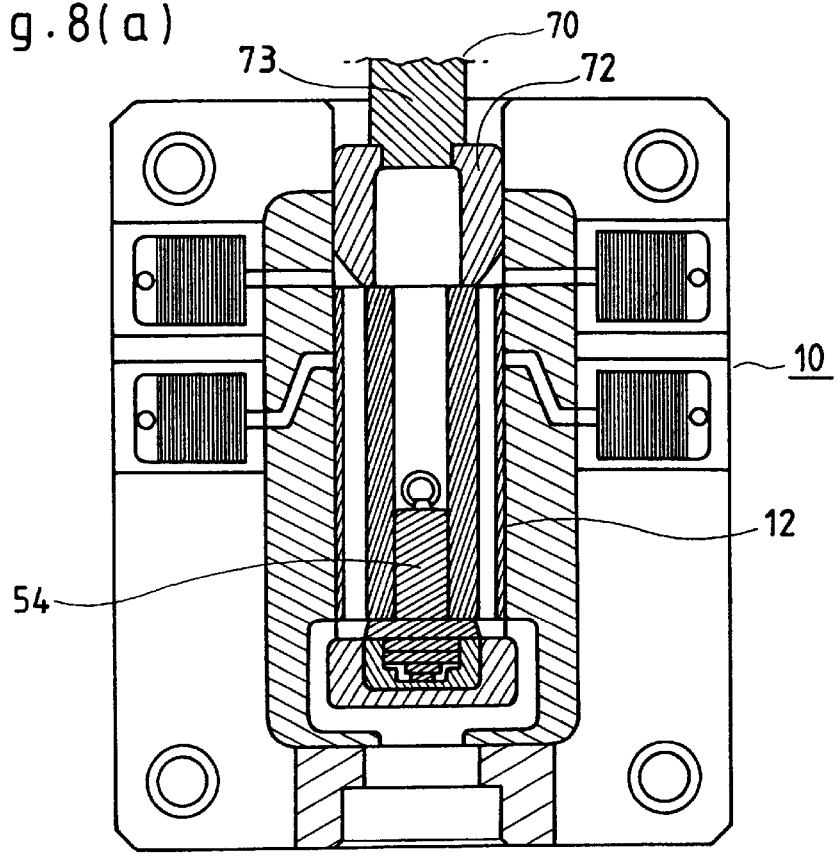
FIG. 8(a) and FIG. 8(b) are schematic views explaining that an axial dimension of a cup portion of a holding portion for holding the rotor core by acting on the end portion of the rotor core is changed in correspondence to a length of the axial dimension of the rotor core housed in the recess portion of the casting mold of the conductor casting apparatus.
Figure 8B:
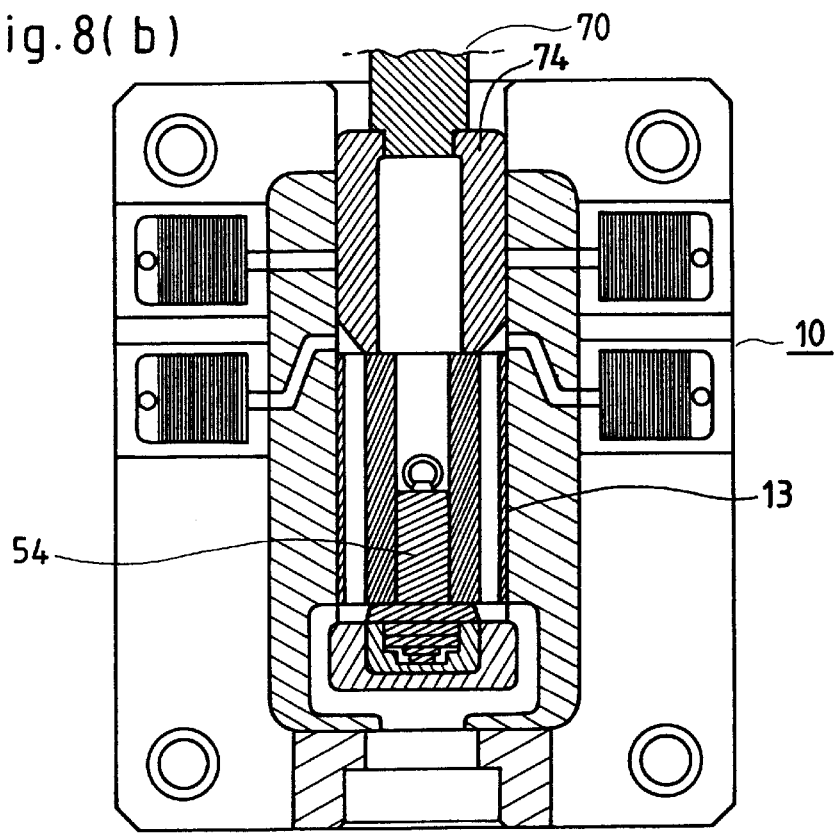

In the embodiment shown in FIG. 8(a) and FIG. 8(b), the cups 72 differing in axial length are used, and replaced according to the axial length of the rotor core 12, thereby making it possible to adjust the rotor core 12 towards the direction of the end portion. In the case where the axial dimension of the rotor core 12 is long, as shown in FIG. 8(a), the cup 72 having a shorter axial dimension is used. In contrast, in the case where the axial dimension of the rotor core 12 is short, as shown in FIG. 8(b), the cup 74 having a longer axial dimension is used. In this manner, by using, for the holding portion 70, the cups 72 and 74, each having the axial dimension in correspondence to the axial length of the rotor core 12, the same casting apparatus can be used for casting even when the axial length of the rotor core 12 is changed.

Figure 9A:
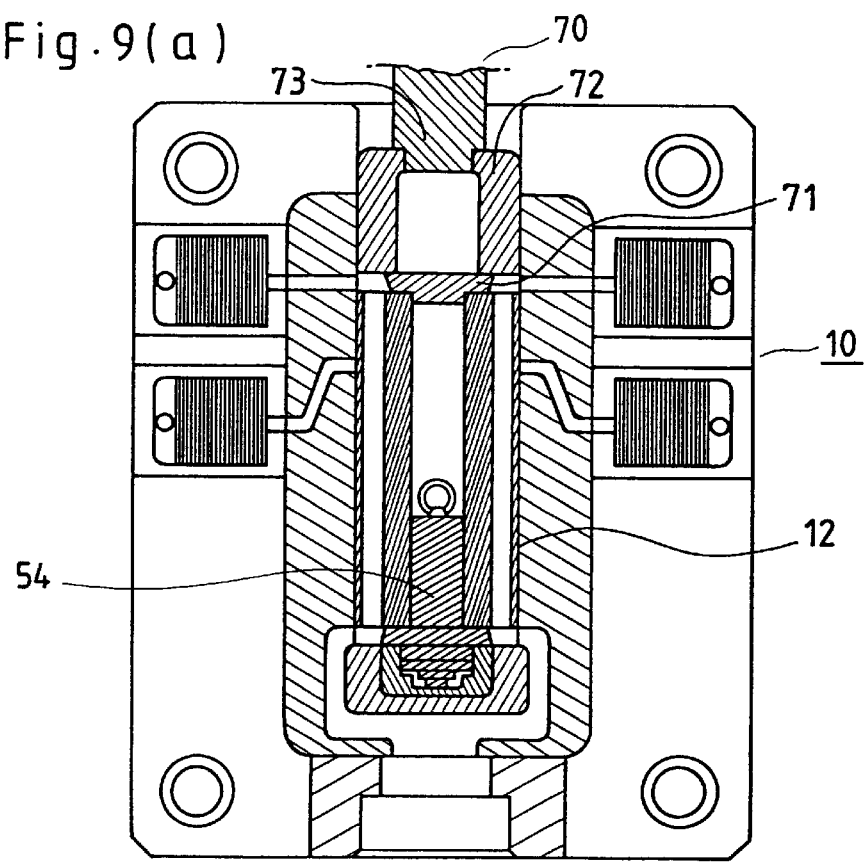
FIG. 9(a) and FIG. 9(b) are schematic views explaining that an axial dimension of a spacer disposed between a cup portion and the end portion of the rotor core is changed in accordance with the axial dimension of the rotor core housed in the recess portion of the casting mold of the conductor casting apparatus.
Figure 9B:
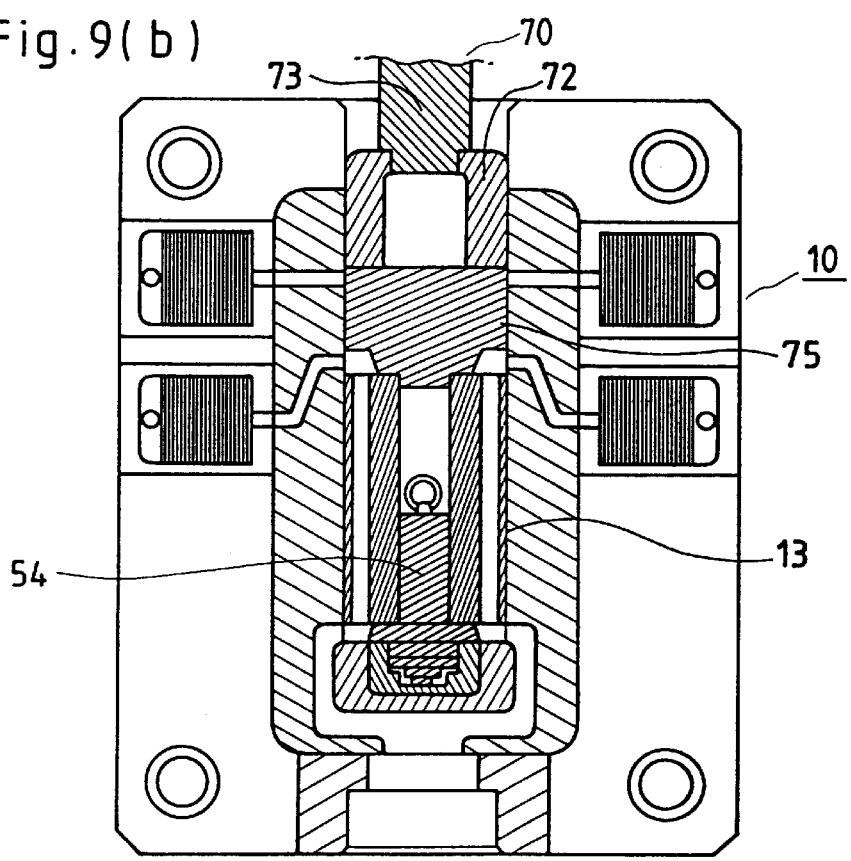

In the embodiment shown in FIG. 9(a) and FIG. 9(b), a plurality of spacers 71 and 75, each differing in axial dimension are provided, and a spacer in correspondence to the axial dimension of the rotor core 12 is selected from among them. In the case that the axial dimension of the rotor core 12 is long, as shown in FIG. 9(a), the spacer 71 having a shorter axial length is used. In contrast, in the case that the axial dimension of the rotor core 12 is short, as shown in FIG. 9(b), the spacer 75 having a longer axial dimension is used. In this manner, by selectively using the spacers 71 and 75, each having the axial dimension in correspondence to the axial length of the rotor core 12, the same conductor casting apparatus can be used for casting even when the axial length of the rotor core 12 is changed.

The spacers 71 and 75 in the embodiment of FIG. 9(a) and FIG. 9(b) partly project on the side facing to the rotor cores 12 and 13 to form the projecting portion and the shoulder portion. The projecting portion has a diameter substantially equal to the inner diameter of the rotor cores 12 and 13, and the spacers 71 and 75 and the rotor cores 12 and 13 can be positioned by inserting the projecting portion into the space defining the inner diameter of the rotor cores 12 and 13 and bringing the shoulder portion into contact with the end surface of the rotor cores 12 and 13. Further, the rotor core and the spacer can be set simultaneously within the casting mold by sliding the rotor cores 12 and 13 and the spacers 71 and 75 together on the core supporting rail after mounting the spacers 71 and 75 on the rotor cores 12 and 13 disposed on the core supporting rail. The same effect can be obtained by changing the combination of both the cup and the spacer as well as changing only one of the cup 72 or 74 and the spacer 71 or 75.

Further, the conductor casting apparatus 10 can be used for casting a rotor provided with a balance ring. The casting of the rotor provided with the balance ring will be described below with reference to FIG. 10.

Figure 10:
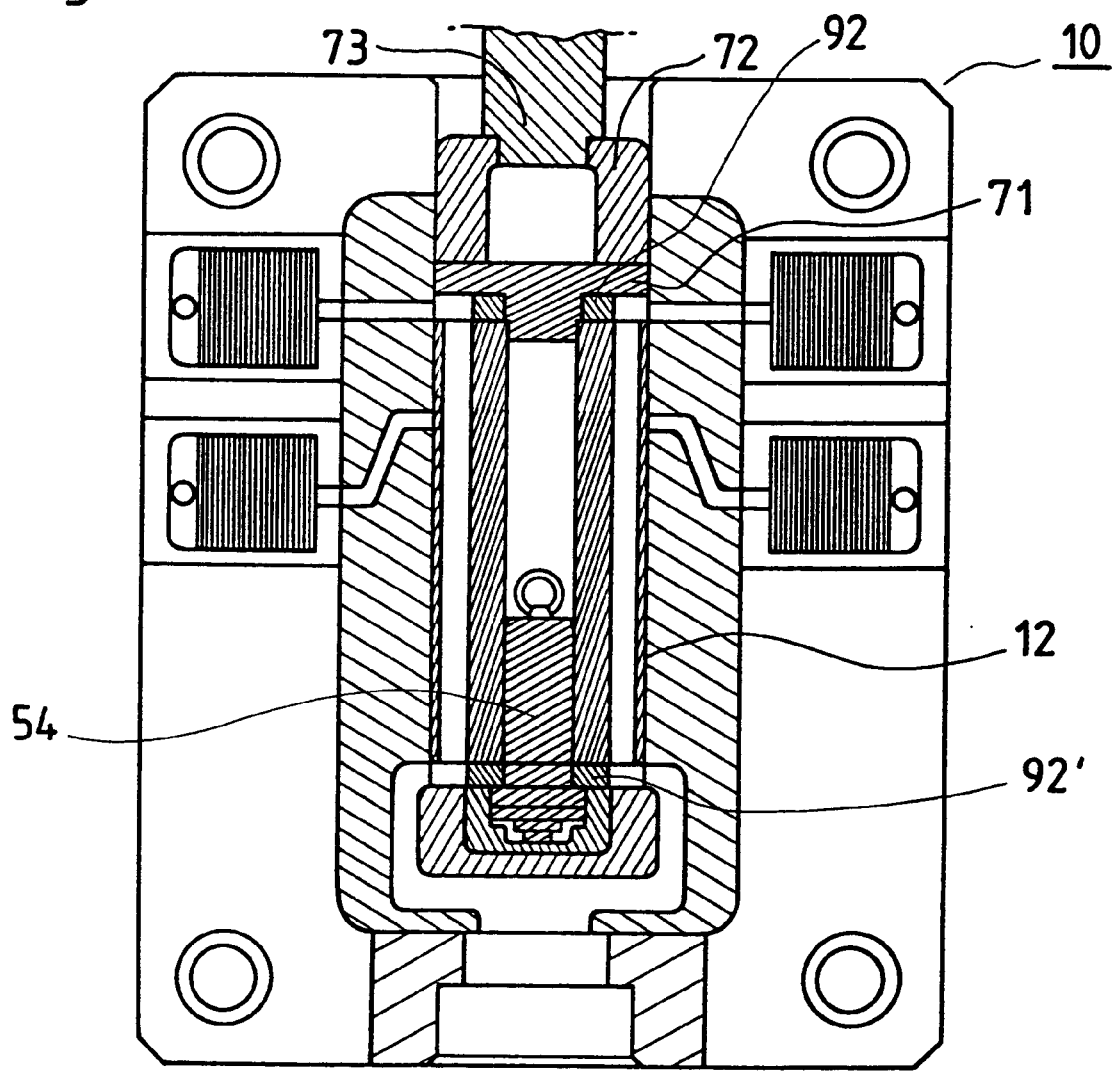
FIG. 10 is a schematic view explaining that the conductor of the rotor provided with a balance ring is formed by the conductor casting apparatus.

For casting this rotor the spacer 71 is used in the same manner as in the case shown in FIG. 9(a). However, the spacer 71 used here has a larger axial length of the projecting portion than that of the spacer shown in FIG. 9(a) so as to hold a balance ring 92 between the shoulder portion of the spacer 71 and the upper end surface of the rotor core 12. In FIG. 10, the spacer 71 temporarily fixes the balance ring 92 to the rotor core 12 by holding the balance ring 92 against the rotor core 12, using the extended portion of the projecting portion. Further, a lower balance ring 92' is inserted into the sleeve portion 54a of the simple mandrel 54 and received by the base 58 so as to be fixed. When the molten metal is filled in a state that the balance ring 92 is temporarily fixed to the rotor core 12, the balance ring 92 is fixed to the rotor core 12 simultaneously with the conductor casting.

Figure 11:
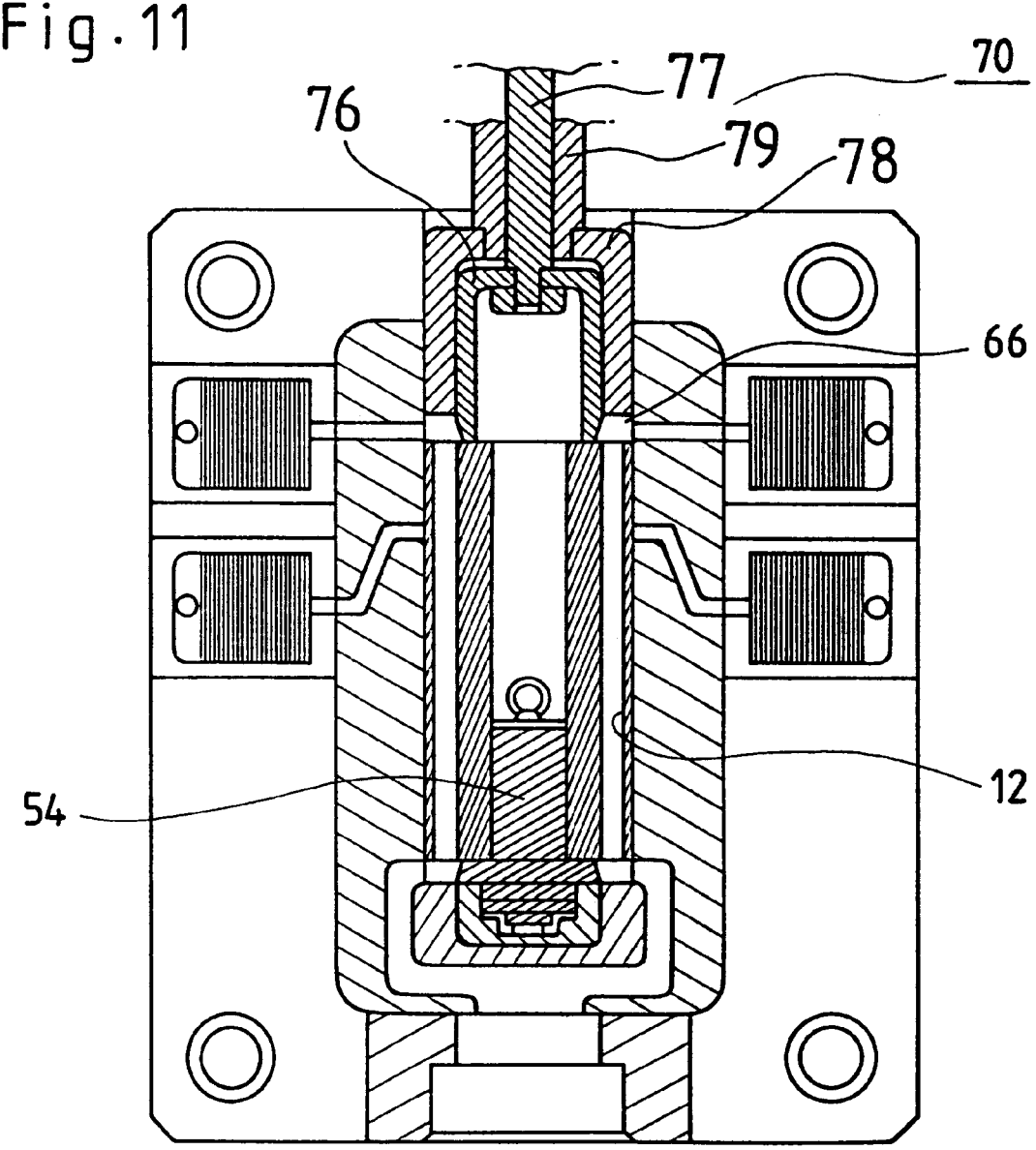
FIG. 11 is a schematic view showing an apparatus for casting a conductor which is provided with a cup for locally applying pressure to an end ring forming portion disposed on a side opposite to a sprue, in addition to the cup acting on the end surface of the rotor core housed in the recess portion of the casting mold so as to hold the rotor core, thereby enabling the cups to be driven independently by the respective cylinders, and showing that the mandrel shown in FIG. 2(a) is employed for the rotor core in the conductor casting apparatus.

Although holding portion 70 mentioned above employs the single cylinder 73, a double cylinder may be employed by adding an additional cylinder for localized application of pressure. FIG. 11 is a diagram for explaining the holding portion 70 using the double cylinder. Further, here, only the things different from the structure explained in the preceding embodiment will be described, and the explanation of the common things will be omitted.

The holding portion 70 shown in FIG. 11 has both a holding means for holding the rotor core 12 at a predetermined position within the recess portion 14 against the filling pressure of the molten metal and locally pressing cup for locally applying pressure to the molten metal filled in the conductor forming cavity (the plurality of slots 44 in the rotor core 12) independently from the filling pressure.

The holding portion 70 is supported at the upper end (on the side opposite to the sprue) of the movable mold 26, and comprises a first cylinder 77, a fixing cup 76 connected to the first cylinder 77, a second cylinder 79 and a locally pressing cup 78 connected to the second cylinder 79. The fixing cup 76 fixes the rotor core 12 within the recess portion 14, and the locally pressing cup 78 additionally applies localized press to the molten metal filled in the second end ring cavity 66.

When the first cylinder 77 is driven and the work fixing cup 76 is advanced (descended), the axial end surface thereof is brought into contact with the axial end surface of the rotor core 12 within the recess portion 14. As a result, the rotor core 12 is held at a predetermined position within the recess portion 14 between the work fixing cup 76 and the core supporting rail 34. Further, when the second cylinder 79 is driven at a proper timing so as to advance (descend) the locally pressing cup 78, the axial end surface of the locally pressing cup 78 compress the molten metal filled in the second end ring cavity 66. As a result, the second end ring corresponding to the end ring formed on the side opposite to the sprue is prevented from forming the blowholes.

According to the embodiments of the invention, it is not necessary to fix both ends of the lamination of steel sheets by the fastening member, so that the provision of the fastening member and its forming process can be omitted.

In the apparatus for casting the conductor of the cage rotor of the induction motor shown in FIG. 11, the mandrel (the simple mandrel 54) in the form shown in FIG. 7 is used as the mandrel. However, in place of this simple mandrel, as shown in FIG. 12, a mandrel 57 (hereinafter referred to as the conventional mandrel) comprising a sleeve 53 having an axial length equal to that of the rotor core 12 and a diameter substantially equal to the inner diameter of the rotor core, and an upper cap 51 and lower cap 55 respectively mounted on the upper end and the lower end of the sleeve 53 may be employed.

Figure 12:
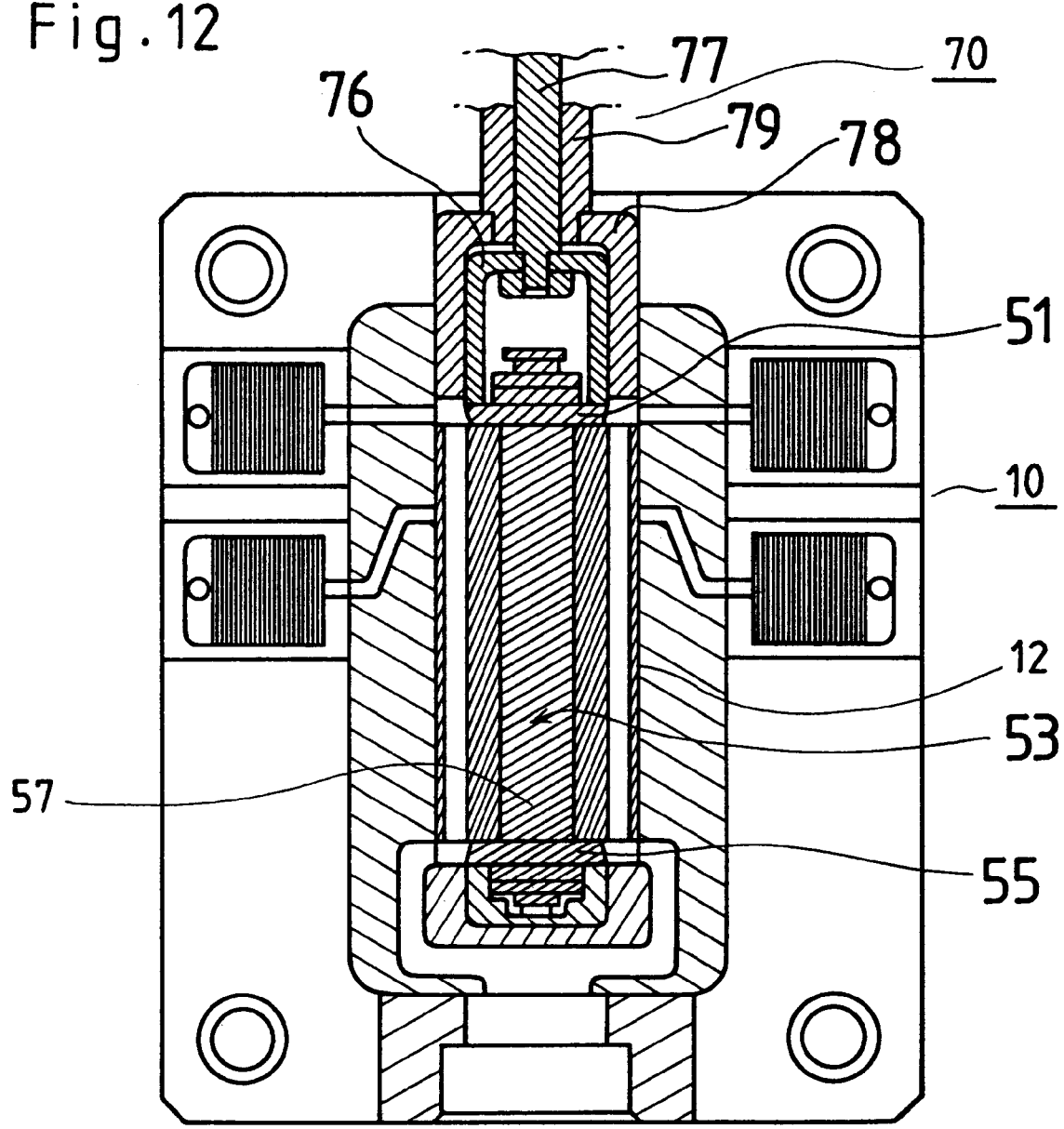
FIG. 12 is a schematic view showing that a mandrel including a sleeve having the same length as the axial length of the rotor core is employed in place of the mandrel in the form shown in FIG. 11.

An apparatus for casting the conductor of the cage rotor of the induction motor using the conventional mandrel 57 is shown in FIG. 12. The conductor casting apparatus is provide with the holding portion 70 employing the double cylinder (the first cylinder 77 and the second cylinder 79) in the same manner as the conductor casting apparatus shown in FIG. 11, and is suitable particularly for casting a rotor for high speed rotation. The operation in the case that the conventional mandrel 57 is used for casting by the conductor casting apparatus is the same as the case shown in FIG. 11, so that the explanation thereof is omitted.

Figure 13A:
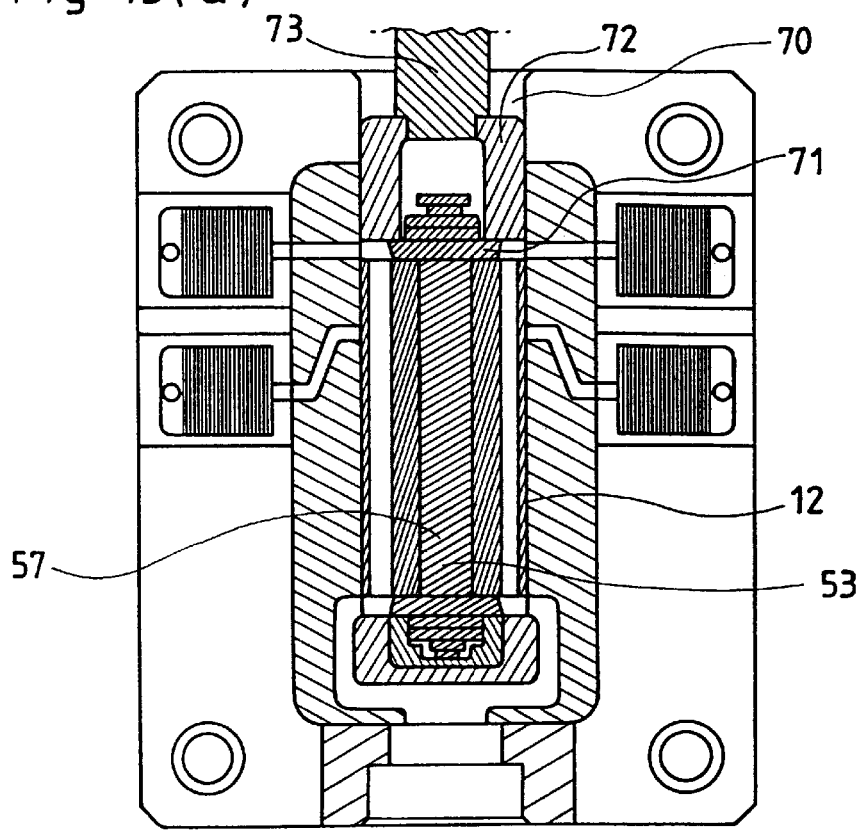
FIG. 13(a) and FIG. 13(b) are schematic views showing a state in which the mandrel shown in FIG. 2(a) and FIG. 2(b) are replaced by the mandrel shown in FIG. 12.
Figure 13B:
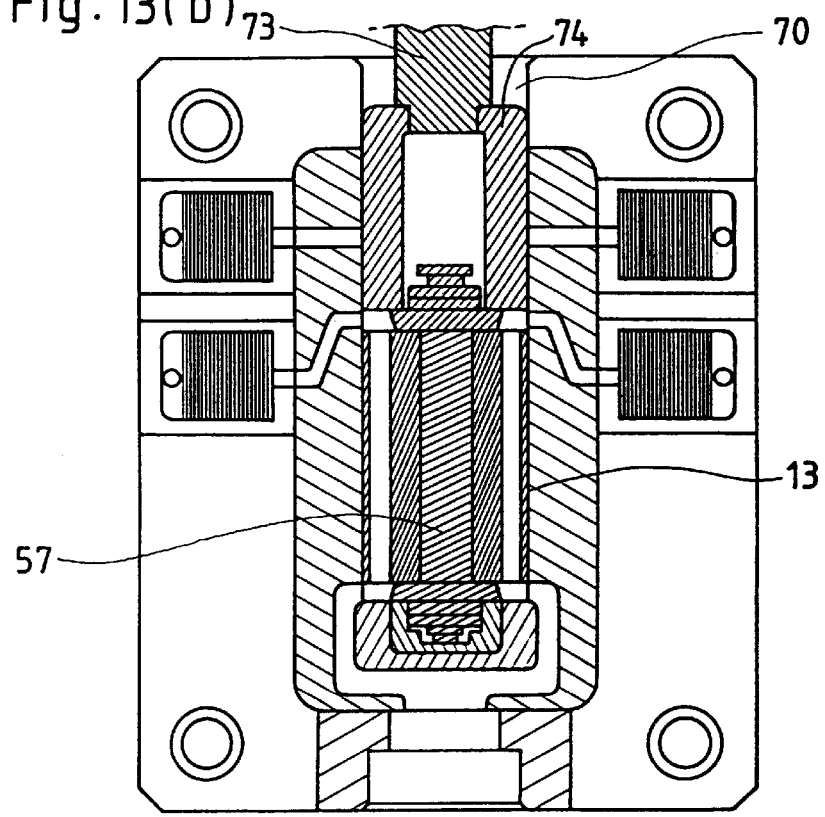
Figure 14:
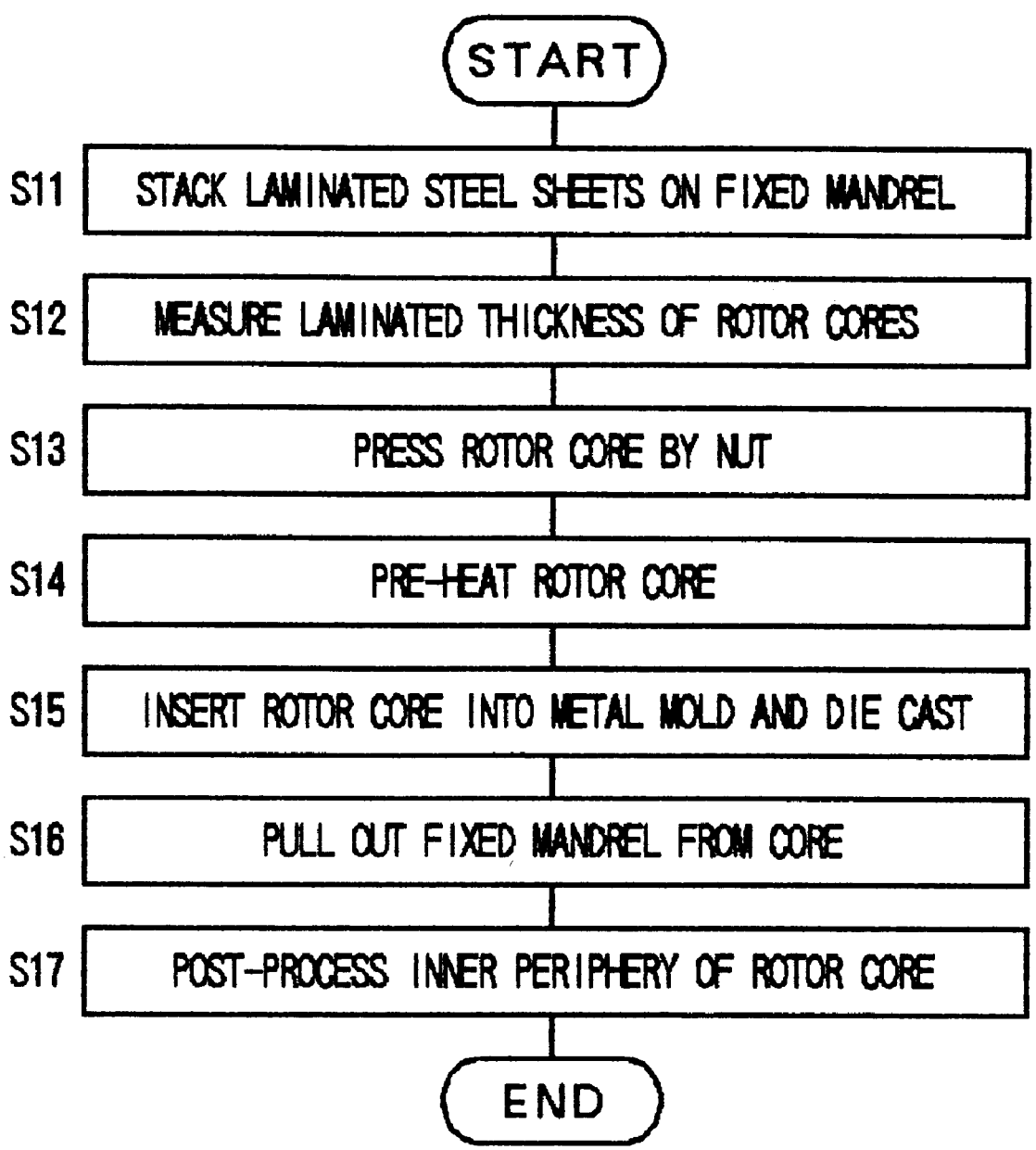
FIG. 14 is a flow chart showing a series of steps of a conventional embodiment comprising a step of forming the rotor core by laminating the steel sheets, a step of forming a conductor portion (the conductor rod and the end ring) in the rotor core by the conductor casting apparatus and a step of removing the rotor in which the conductor portion is formed in the rotor core from the conductor casting apparatus.
Figure 15:
FIG. 15(a) is a schematic view showing a state in which the steel sheets are laminated.
FIG. 15(b) is a schematic view showing a state in which the mandrel is inserted into the central opening of the laminated steel sheets to form the conductor and unevenness of the central opening of the rotor core existing at this time.
FIG. 15(c) is a schematic view showing a state in which a gap is formed between the mandrel and the rotor core.
FIG. 15(d) is a schematic view showing a state in which the unevenness remains with the central opening of the rotor without being removed even after the conductor is formed and the mandrel is pulled out.
Figure 15:
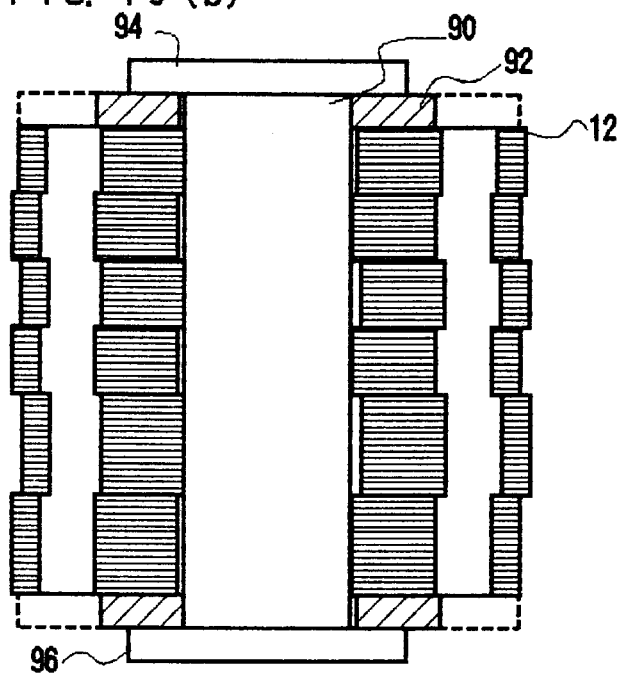
Figure 15:
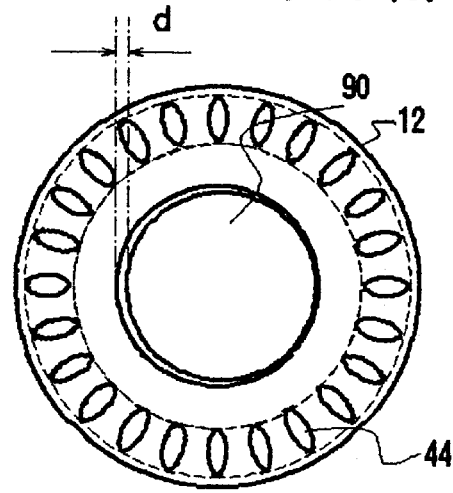
Figure 15:
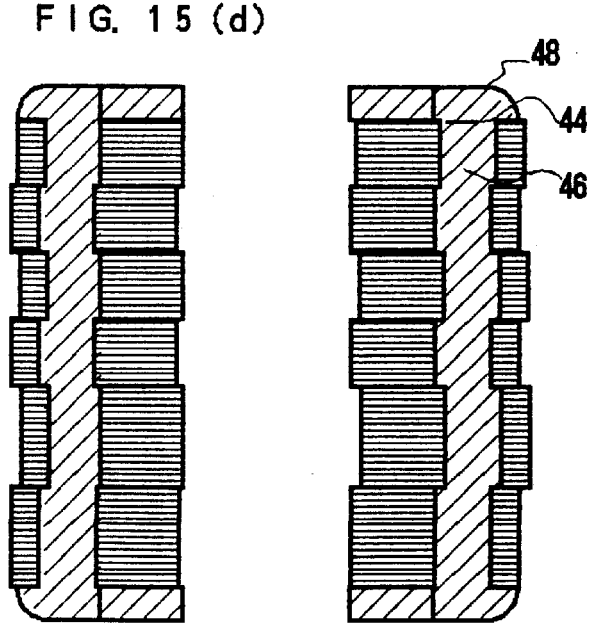

FIG. 12 shows the embodiment in which the conventional mandrel 57 is used in the cage rotor conductor casting apparatus including the holding portion 70 provided with the double cylinder, and an embodiment in which the conventional mandrel 57 described above is used in the cage rotor conductor casting apparatus including the holding portion 70 provided with the single cylinder 73 is shown in FIG. 13(a) and FIG. 13(b).

In the case shown in FIG. 13(a), the axial length of the rotor core 12 is large, so that the cup 72 having a shorter axial length is used and, while in the case shown in FIG. 13(b), the axial length of the rotor core 12 is small, so that the cup 72 having a longer axial length is used. In the case that the conventional mandrel 57 is used, when the sleeve 53 of the mandrel is formed by using a material such as a stainless steel and the like, the same effect (aligning the inner diameter of the core) as the open mandrel 80 described can be obtained, and, in the case of using the rotor core 12 having a different axial length, as in the same manner as the embodiment shown in FIG. 2(a) and FIG. 8(a), casting operation can be carried out by changing the stroke of the cylinder or the axial dimension of the cup. Since the operation in this case is the same as the operation in the conductor casting apparatus explained with reference to FIG. 11, the explanation thereof is omitted.

We claim:

1. An apparatus for casting a conductor of a cage rotor of an induction motor, comprising:

a casting mold provided with a recess portion for receiving a rotor core formed by piling up steel sheets and restraining a motion of the rotor core in a radial direction, and a holding portion which moves toward an end surface of the rotor core housed in the recess portion of said casting mold by drive means and acts on the end surface so as to fix the axial motion of the rotor core, wherein molten metal is supplied into a plurality of slots formed in the rotor core fixed by said recess portion and said holding portion so as to form a plurality of conductor rods and a pair of end rings communicating the ends of the conductor rods with one another, wherein a moving amount of said holding portion can be adjusted in correspondence to an axial length of the rotor core.

2. An apparatus for casting a conductor of a cage rotor of an induction motor, comprising:

a casting mold provided with a recess portion for receiving a rotor core formed by piling up steel sheets and restraining a motion of the rotor core in radial direction, and a holding portion which moves toward an end surface of the rotor core housed in the recess portion of said casting mold by drive means and acts on the end surface so as to fix the axial motion of the rotor core, wherein molten metal is supplied into a plurality of slots formed in the rotor core fixed by said recess portion and said holding portion so as to form a plurality of conductor rods and a pair of end rings communicating the ends of the conductor rods with one another, wherein only said holding portion is made replaceable, and the casting mold is made common.

3. An apparatus for casting a conductor of a cage rotor of an induction motor, comprising:

a casting mold provided with a recess portion for receiving a rotor core formed by piling up steel sheets and restraining a motion of the rotor core in a radial direction, and a holding portion which moves toward an end surface of the rotor core housed in the recess portion of said casting mold by drive means and acts on the end surface so as to fix the axial motion of the rotor core, wherein molten metal is supplied into a plurality of slots formed in the rotor core fixed by said recess portion and said holding portion so as to form a plurality of conductor rods and a pair of end rings communicating the ends of the conductor rods with one another, wherein said holding portion comprises a cylinder moving toward said end surface of the rotor core by means of said drive means and a pressing member connected to the cylinder and acting on said end surface of the rotor core by a motion of the cylinder, and said pressing member is selected so that it may have an axial dimension corresponding to the axial length of the rotor core and is mounted on said cylinder.

4. An apparatus for casting a conductor of a cage rotor of an induction motor as recited in claim 3, wherein said pressing member is formed of a cup-shaped member and an end surface of the cup-shaped member directly acts on an end surface of the rotor core.

5. An apparatus for casting a conductor of a cage rotor of an induction motor as recited in claim 3, wherein said pressing member comprises a cup-shaped member and a spacer which is inserted between an end surface of the cup-shaped member and an end surface of the rotor core, and wherein the spacer having an axial dimension in correspondence to the axial length of the rotor core is selected.

6. An apparatus for casting a conductor of a cage rotor of an induction motor as recited in claim 1, wherein said holding portion comprises a first cylinder, a first cup connected to the first cylinder, a second cylinder operating independently of the first cylinder and a second cup connected to the second cylinder, and wherein the first cup acts on an end surface of the rotor core housed in the recess portion of the casting mold, and the second cup additionally applies pressure to the molten metal filled in the end ring cavity formed in the side opposite to the sprue.

7. An apparatus for casting a conductor of a cage rotor of an induction motor as recited claim 1, wherein, as an accessory, there is provided a first mandrel whose thermal expansion rate is larger than that of the steel sheets constituting the rotor core, whose axial dimension is not shorter than that of the rotor core and which has a sleeve portion with a heating means provided inside thereof, and wherein said first mandrel is heated by the heating means after being inserted into the central opening of the rotor core but prior to being received within the recess portion of the casting mold, whereby an unevenness of the inner periphery of the central opening of the rotor core is leveled by the thermal expansion of the sleeve.

8. An apparatus for casting a conductor of a cage rotor of an induction motor as recited in claim 1, wherein, as an accessory, there is provided a second mandrel comprising a shaft portion having an outer diameter allowable for being inserted into the central opening of the rotor core and an end portion having a supporting portion provided at an end of the shaft portion and a shoulder portion having a diameter larger than the outer diameter of the shaft portion disposed on the other end of the shaft portion, and wherein, when the second mandrel is inserted into the central opening of the rotor core received into the recess portion of the casting mold and the casting is completed, the rotor core is removed out of the recess portion of the casting mold together with the second mandrel by being held by the supporting portion of the second mandrel.

9. An apparatus for casting a conductor of a cage rotor of an induction motor as recited in claim 1, wherein said casting mold is provided with a plurality of air vents in an axial direction on the inner surface of the recess portion which houses the rotor core.

10. A method for casting a conductor of a cage rotor of an induction motor, comprising steps of;

(a) laminating steel sheets to a predetermined thickness by passing a central opening of the steel sheets through a sleeve portion of a mandrel, (b) leveling an unevenness of inner periphery of a central opening of the laminated steel sheets occurred during laminating process by the effect of thermal expansion of said sleeve resulting from being heated, (c) pressing said laminated steel sheets in the axial direction and temporarily fixing the outer periphery thereof so as to form the rotor core, (d) housing said rotor core in the recess portion of the casting mold formed in the conductor casting apparatus, (e) adjusting an axial dimension of the holding portion or a stroke of the holding portion acting on an axial end of said rotor core, to axial dimension of said rotor core, and (f) forming a plurality of conductor rods and a pair of end rings communicating ends of the conductor rods with one another by supplying molten metal into a plurality of slots formed in the rotor core which is held by said holding portion.

11. A method for casting a conductor of a cage rotor of an induction motor as recited in claim 10, wherein added between said Steps (c) and (d) is a step of inserting a mandrel provided with a shaft portion having an outer diameter allowable for being inserted into the central opening of the rotor core, an end portion with a supporting portion disposed at an end of the shaft portion and a shoulder portion having a diameter larger than the outer diameter of said shaft portion disposed at the other end of the shaft portion, and and further added after said Step (f) is a step of removing, by using said mandrel, the rotor, with which a plurality of conductor rods and a pair of end rings are formed in the rotor core, from the casting mold.

* * * * *

UNITED STATES PATENT AND TRADEMARK OFFICE
CERTIFICATE OF CORRECTION

PATENT NO.:     5,937,930
DATED     :     August 17, 1999
INVENTOR(S):    Kosei NAKAMURA, et al.

It is certified that error appears in the above-identified patent and that said Letters Patent is hereby corrected as shown below:

Title Page - Item [75]
        line 1, change "Oshino-mura" to --Minamitsuru--;
        line 2, delete "[-gun]";
        line 3, change "Oshino-mura" to --Minamitsuru--.

Col. 6, line 29, delete "[,] after "10".

Signed and Sealed this

Fourth Day of April, 2000

Attest:

Q. TODD DICKINSON

Attesting Officer         Director of Patents and Trademarks